(12) United States Patent
Ohta et al.

(10) Patent No.: US 7,293,466 B2
(45) Date of Patent: Nov. 13, 2007

(54) BOLT WITH FUNCTION OF MEASURING STRAIN

(75) Inventors: Hiroyuki Ohta, Tsuchiura (JP);
Takashi Sumigawa, Fukuoka (JP)

(73) Assignee: Hitachi, Ltd., Tokyo (JP)

( * ) Notice: Subject to any disclaimer, the term of this patent is extended or adjusted under 35 U.S.C. 154(b) by 106 days.

(21) Appl. No.: 11/183,803

(22) Filed: Jul. 19, 2005

(65) Prior Publication Data

US 2007/0017295 A1    Jan. 25, 2007

(51) Int. Cl.
*G01B 7/16*      (2006.01)
*G01L 1/00*      (2006.01)
(52) U.S. Cl. .......................... 73/777; 73/774; 73/763; 73/761; 73/760; 257/417
(58) Field of Classification Search ................. 73/761, 73/760, 763, 774, 777; 257/417
See application file for complete search history.

(56) References Cited

U.S. PATENT DOCUMENTS

| | | | | |
|---|---|---|---|---|
| 3,186,217 A | * | 6/1965 | Pfann | 73/777 |
| 3,424,000 A | * | 1/1969 | Bubel et al. | 73/861.71 |
| 3,611,241 A | * | 10/1971 | Herceg | 338/2 |
| 3,757,580 A | * | 9/1973 | Crocker et al. | 73/862.339 |
| 4,320,664 A | * | 3/1982 | Rehn et al. | 73/708 |
| 4,429,579 A | * | 2/1984 | Wilhelm | 73/768 |
| 4,462,018 A | * | 7/1984 | Yang et al. | 338/3 |
| 4,553,124 A | * | 11/1985 | Malicki | 338/5 |
| 4,576,052 A | * | 3/1986 | Sugiyama | 73/862.68 |
| 4,683,755 A | * | 8/1987 | Samek | 73/727 |
| 4,823,606 A | * | 4/1989 | Malicki | 73/761 |
| 4,858,475 A | * | 8/1989 | Jacobson et al. | 73/862.631 |
| 5,174,884 A | * | 12/1992 | Shimada et al. | 204/406 |
| 5,392,027 A | * | 2/1995 | Brunot et al. | 340/561 |
| 5,583,295 A | * | 12/1996 | Nagase et al. | 73/708 |
| 5,650,576 A | * | 7/1997 | Durchschlag | 73/862.631 |
| 6,444,487 B1 | * | 9/2002 | Boggs et al. | 438/48 |
| 2003/0000314 A1 | * | 1/2003 | Smith et al. | 73/849 |

(Continued)

FOREIGN PATENT DOCUMENTS

JP         5-7118677         7/1982

(Continued)

OTHER PUBLICATIONS

Higson, G.R., "Recent advances in strain gauges." Journal of Scientific Instruments. Vol. 41. Jul. 1964. pp. 405-414. Accessed online Dec. 22, 2006. <http://www.iop.org/EJ/abstract/0950-7671/41/7/301>.*

(Continued)

*Primary Examiner*—Edward Lefkowitz
*Assistant Examiner*—Punam Patel
(74) *Attorney, Agent, or Firm*—Antonelli, Terry, Stout & Kraus, LLP.

(57) ABSTRACT

A bolt with a function of measuring strain, comprising a Wheatstone bridge circuit comprising a strain sensor and a dummy resistor, a translate circuit that amplifies a signal from the Wheatstone bridge circuit to convert the same into a digital signal, a transmitting circuit that transmits the digital signal outside the bolt, and a power circuit, by which electromagnetic wave energy received from outside the bolt is supplied as a power source for at least any one of the circuits.

15 Claims, 23 Drawing Sheets

U.S. PATENT DOCUMENTS

2003/0234730 A1* 12/2003 Arms et al. ............ 340/870.01
2006/0213278 A1* 9/2006 Arms et al. ................... 73/781

FOREIGN PATENT DOCUMENTS

| | | |
|---|---|---|
| JP | 2-192581 | 7/1990 |
| JP | 5-196525 | 8/1993 |
| JP | 9-072805 | 3/1997 |
| JP | 9-269268 | 10/1997 |
| JP | 11-118637 | 4/1999 |
| JP | 2002-004798 | 1/2002 |
| JP | 2003-166865 | 6/2003 |

OTHER PUBLICATIONS

Pfann W.G. and Thurston R.N., "Semiconducting Stress Transducers Utilizing the Transverse and Shear Piezoresistance Effects." Journal of Applied Physics. vol. 32, No. 10. Oct. 1961. pp. 2008-2019. Accessed online Dec. 22, 2006. <http://scitation.aip.org>.*
Japanese Office Action, issued Dec. 5, 2007.

* cited by examiner

DIRECTION OF STRAIN MEASUREMENT
(BOLT AXIAL DIRECTION)

<100>
<110>

DIRECTION OF STRAIN MEASUREMENT
(BOLT AXIAL DIRECTION)

DIRECTION OF STRAIN MEASUREMENT
(BOLT AXIAL DIRECTION)

<100>
<110>

STRAIN MEASUREMENT DIRECTION

◄──► (AXIAL DIRECTION OF BOLT)

<100>
<110>

BOLT WITH FUNCTION OF MEASURING STRAIN

BACKGROUND OF THE INVENTION

The present invention relates to a bolt capable of measuring a mechanical quantity.

As a technology that monitors strain of a bolt, method, in which a slot is provided in an axial direction (lengthwise) of a bolt and optical fibers are inserted into the slot to measure strain, and method of embedding a strain gauge into the slot, have been put into practical use. Since a fiber cable and a lead wire must be taken outside from a head of a bolt in these technologies to become an obstacle at the time of bolt clamping, however, the technologies are not suited to applications, in which strain in many bolts is monitored constantly. Hereupon, it is thought of, as a solution, to embed a strain sensor, such as strain gauge, etc., in a bolt and to take out measured values through display or radio waves. JP-A-11-118637 is listed as a patent therefor, and shows a sensor bolt comprising a sensor, an amplifier for sensed values, and a battery built in the bolt and a display provided in the bolt for display in the case where a measured strain becomes equal to or less than a set value.

Strain sensors such as strain gauges, quartz sensors, etc. have a very small output value relative to strain while being large in temperature dependency. Therefore, a serious problem comes out in accuracy of measured values in the case where temperature distribution is involved in a bolt as frequently experienced in clamp bolts of a piping system. Thus, it is an object of the present invention to provide a bolt with a function of measuring strain, having a favorable accuracy of measurement even in the case where temperature distribution is involved in the bolt, and eliminating connection of a lead wire outside the bolt.

Also, with conventional examples as in the above-described patent, etc., a battery, a strain sensor, an amplifier, etc. are built in so as to prevent a lead wire from being exposed outside a bolt, in view of a problem in workability. However, there is caused a problem that a sensor is limited in service life because of being battery-operated. Since ordinary strain sensors consume a battery due to flow of electric current of a current value in the order of mA, the number of measurements of an amount of strain is limited. Since bolts on bridge piers, in tunnels, or the like cannot be in many cases exchanged easily, it is essential to extend a service life in order to increase the applications. Thus, it is another object of the present invention to provide a bolt with a function of measuring strain, eliminating connection of a lead wire outside the bolt and enabling use without caring for the service life of a battery.

BRIEF SUMMARY OF THE INVENTION

In order to attain the objects, electric power required for a strain sensor, amplification, an analog/digital converter, rectification•detection•modem, and communication control is supplied by energy of any one of electromagnetic induction, electromagnetic induction, microwave feeding, and optical coupling.

Also, in order to enable measurement with high accuracy even in the case where temperature distribution in a bolt is large, a Wheatstone bridge circuit is formed and dummy resistors are also arranged specifically in a hole formed in an axial direction of a bolt in the same manner as strain sensors.

Also, in order to enable measurement with high accuracy even in the case where temperature distribution in a bolt is large, impurity diffusion layers of which specific crystal orientation is in a lengthwise direction are formed on a silicon substrate, the crystal orientation is changed to form strain sensors and dummy resistors separately, and the silicon substrate is arranged in a hole formed in an axial direction of the bolt.

The following configurations can be provided as examples of concrete configurations.

A bolt with a function of measuring strain is characterized in that a Wheatstone bridge circuit comprising a strain sensor and a dummy resistor, a translate circuit that amplifies a signal from the Wheatstone bridge circuit to convert the same into a digital signal, a transmitting circuit that transmits the digital signal outside the bolt, and a power circuit, by which electromagnetic wave energy received from outside the bolt is supplied as a power source for at least any one of the circuits are provided.

Alternatively, a bolt with a function of measuring strain is characterized in that a Wheatstone bridge circuit comprising a strain sensor and a dummy resistor, a translate circuit that amplifies a signal from the Wheatstone bridge circuit to convert the same into a digital signal, a transmitting circuit that transmits the digital signal outside the bolt, and a power circuit, by which electromagnetic wave energy received from outside the bolt is supplied as a power source for at least any one of the circuits are provided in a hole formed in the bolt; the translate circuit, the transmitting circuit, and the power circuit are formed on a common semiconductor chip; and a power supply ground of the semiconductor chip and the bolt are electrically connected.

Alternatively, a bolt with a function of measuring strain is characterized in that a Wheatstone bridge circuit comprising a strain sensor and a dummy resistor, a translate circuit that amplifies a signal from the Wheatstone bridge circuit to convert the same into a digital signal, a transmitting circuit that transmits the digital signal outside the bolt, and a power circuit, by which electromagnetic wave energy received from outside the bolt becomes a power source for any one of the circuits are installed in a hole formed in a direction along a major axis of the bolt; and the Wheatstone bridge circuit and the power circuit are formed on a common monocrystal semiconductor chip.

Alternatively, a bolt with a function of measuring strain is characterized in that a Wheatstone bridge circuit comprising a strain sensor and a dummy resistor, a translate circuit that amplifies a signal from the Wheatstone bridge circuit to convert the same into a digital signal, a transmitting circuit that transmits the digital signal outside the bolt, a power circuit, by which electromagnetic wave energy received from outside the bolt becomes a power source for at least any one of the circuits, and a temperature sensor are installed, the temperature sensor and the Wheatstone bridge circuit are formed in the same silicon monocrystal member, and the temperature sensor comprises an impurity diffusion layer of the member.

According to the invention, the strain sensor can be operated with small electric power, so that measurement with high accuracy becomes possible even in the case where the bolt 1 with a function of measuring strain is operated with the use of electric power supplied through any one of electromagnetic coupling, electromagnetic induction, microwave feeding, and optical coupling.

Alternatively, according to the invention, the Wheatstone bridge circuit is provided in the arrangement-construction described above, so that there is produced an effect that a small change in value of resistance of a mechanical quantity sensor is compensated for and temperature correction becomes possible even in the case where temperature distribution is involved in a bolt.

Other objects, features and advantages of the invention will become apparent from the following descriptions of the embodiments of the invention taken in conjunction with the accompanying drawings.

BRIEF DESCRIPTION OF THE SEVERAL VIEWS OF THE DRAWING

FIG. 4-4A is a circuit diagram illustrating a Wheatstone bridge related to the bolt with a function of measuring strain, according to the first embodiment of the invention.

DETAILED DESCRIPTION OF THE INVENTION

Figure 1:
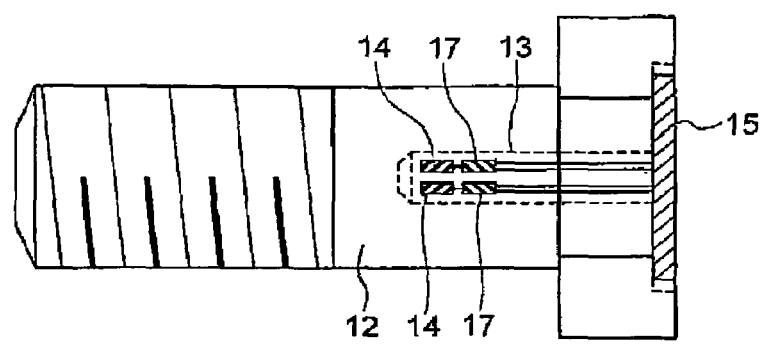
FIG. 1 is a cross sectional view showing a bolt with a function of measuring strain, according to a first embodiment of the invention.
Figure 2:
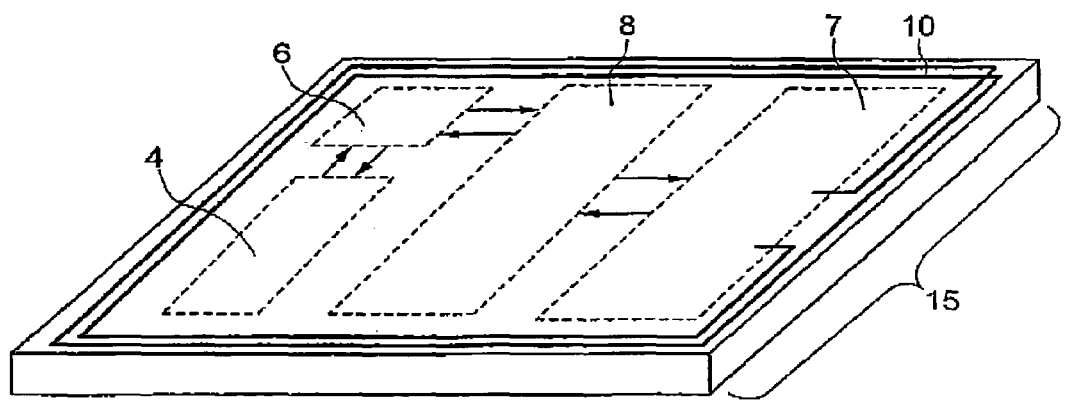
FIG. 2 is a perspective view showing a chip part of the bolt with a function of measuring strain, according to the first embodiment of the invention.

A first embodiment of the invention will be described hereinafter with reference to FIGS. 1 to 6. FIG. 1 shows a bolt 1 with a function of measuring strain, according to a first embodiment of the invention. The embodiment is the bolt 1 with a function of measuring strain characterized in that a wire resistance type or polysilicon strain gauges 14 and dummy resistors 5 are mounted in a hole 13 provided in an axial direction of a bolt 12, and in addition thereto, a chip 15 is provided in which a group of strain sensor amplifiers 4, an analog/digital converter 6, a rectification•detection•modem circuit 7, a communication control 8, and an antenna 10 are accommodated. As shown in FIG. 2, the group of strain sensor amplifiers 4, the analog/digital converter 6, the rectification•detection•modem circuit 7, and the communication control 8 are formed on the common chip 15 made of a monocrystal silicon and the chip 15 is arranged in the vicinity of a surface of a head of the bolt 12. In addition, while the antenna 10 in a state of being accommodated in the chip 15 will be described hereinafter, the same effect can be also obtained when externally mounted.

It is desired that the antenna 10 be accommodated in the chip 15 and the chip 15 be arranged on the surface of the head of the bolt 12. In this case, since it suffices that a recess be formed only in the vicinity of the surface of the bolt to accommodate the chip 15, reduction in strength can be restricted to the minimum even with a bolt having a small diameter. Also, a stress field related to clamping has no influence on the chip 15 because of being arranged on the surface. Therefore, since the electric characteristics of the chip 15 is not varied by the influence of the stress field, there is an advantage that measurement with high accuracy becomes possible.

Figure 3:
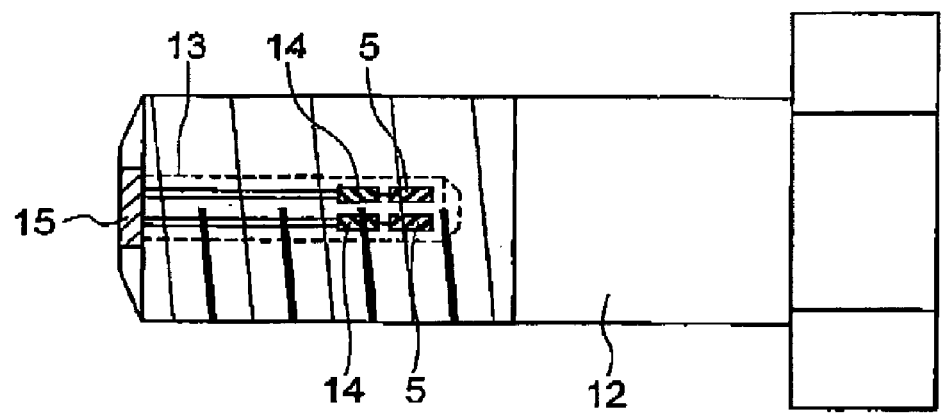
FIG. 3 is a cross sectional view showing the bolt with a function of measuring strain, according to the first embodiment of the invention.

Also, while the chip 15 is arranged on the head of the bolt in FIG. 1, the chip 15 may be arranged at a bottom of the bolt as shown in FIG. 3. The embodiment shown in FIG. 3 is especially effective for a bolt for tire fixation, or the like, in which a tail of the bolt is exposed. While it is necessary in this case to restrict reduction in strength of the bolt, there is an advantage in the invention that reduction in strength of the bolt is small and measurement with high accuracy becomes possible. Also, while being embedded in the bolt in the embodiment in order to measure an axial force of a bolt, arrangement in a connection pin, a hinge, a rivet, or the like will do.

Figure 4A:
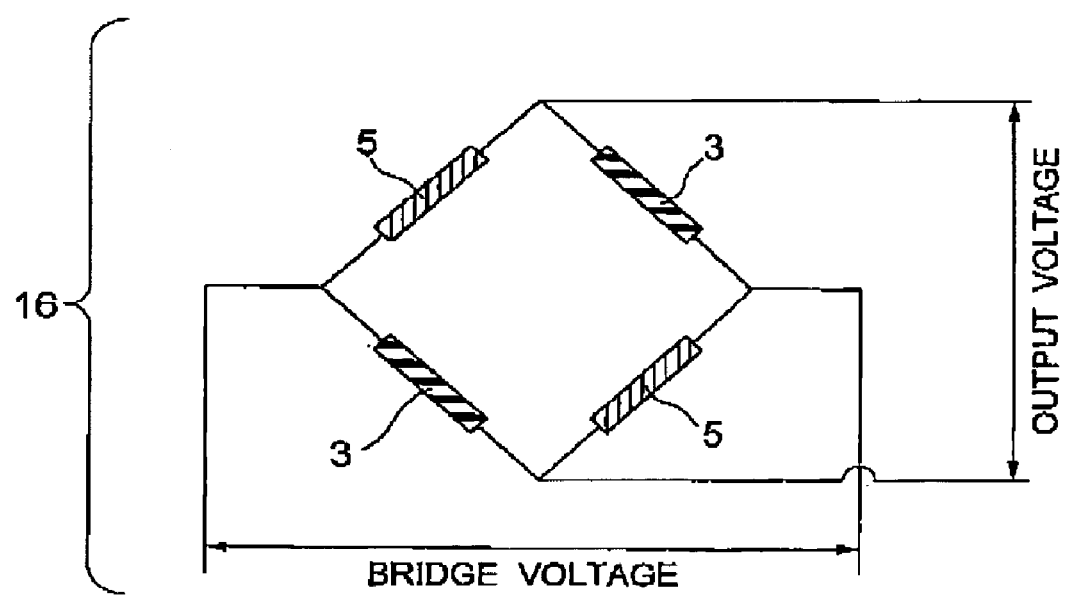
Figure 4B:
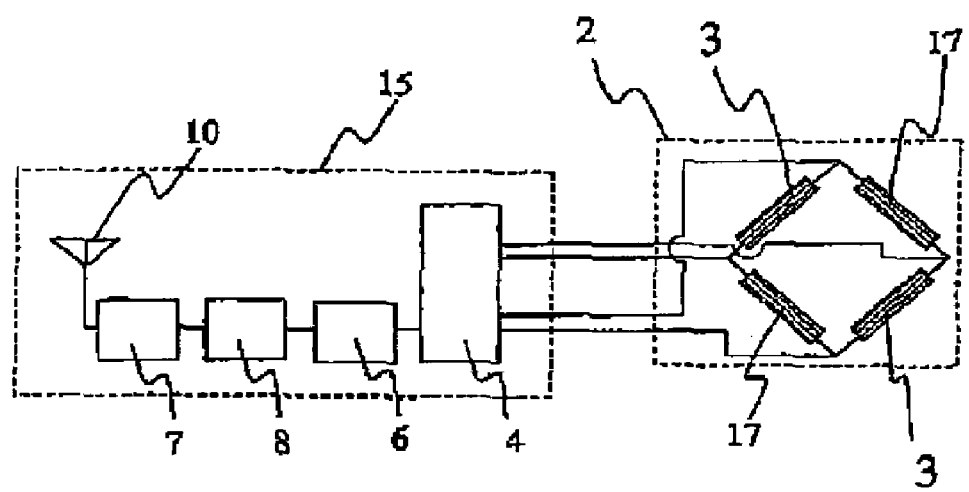
FIG. 4B is a circuit diagram illustrating an exemplary arrangement for the strain sensors and dummy resistors of the instant invention.

FIG. 4B shows That the strain sensors 3 and the dummy resistors 17 of the Wheatstone bridge are formed in a common monocrystal substrate 2 and the strain sensor amplifier 4, the A/D converter 6, the rectification/detection/ modem circuit 7 and the communication control 8 are forming in the chip 15 and wires interconnecting the Wheatstone bride and the chip 15.

Temperature correction can be made with a Wheatstone bridge.

Figure 5:
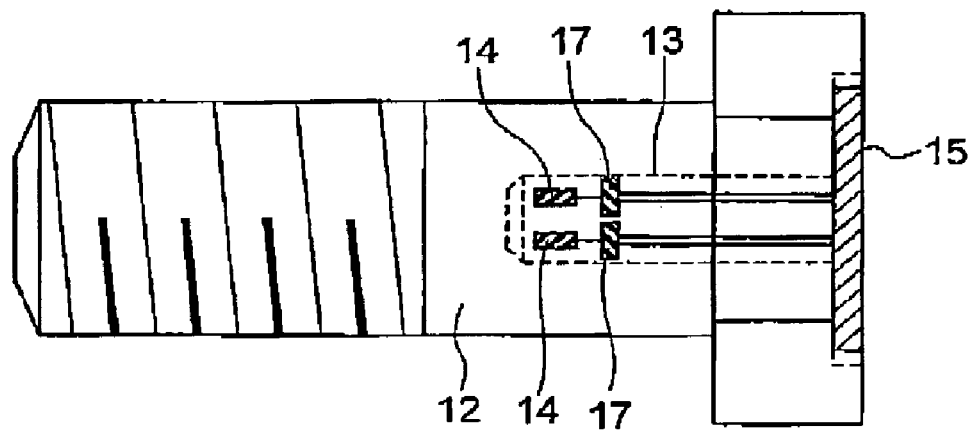
FIG. 5 is a cross sectional view showing the bolt with a function of measuring strain, according to the first embodiment of the invention.
Figure 6:
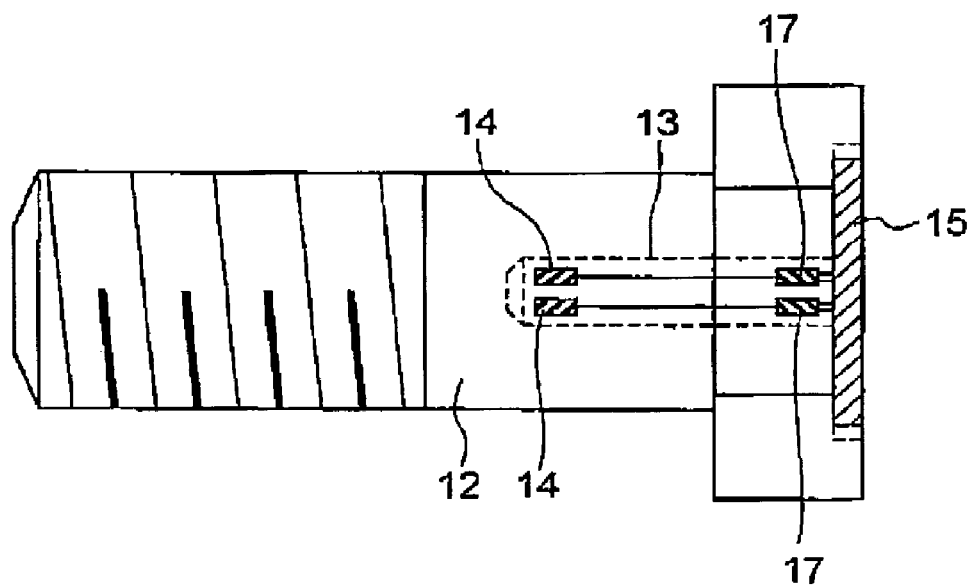
FIG. 6 is a cross sectional view showing the bolt with a function of measuring strain, according to the first embodiment of the invention.

According to the embodiment, a bolt clamping axial force generated in the bolt 12 is measured as changes in resistance by the strain gauges 14, which is mounted in the hole 13 formed in the axial direction of the bolt 12. A changes in value of resistance of the strain gauges 14 as measured is detected as a voltage value, which is in proportion to strain, by a Wheatstone bridge circuit 16 as shown in FIG. 3. FIG. 4 shows a circuit diagram of the Wheatstone bridge circuit. In a strain sensor 3, since strain causes a very small variation in resistance, signal processing in the latter step becomes complex when the variation is amplified as it is. Thus, it is usual in many cases that as seen from the way to use a strain gauge, the Wheatstone bridge circuit 16 is formed whereby an output voltage in proportion to a change in resistance of the strain sensor 3 is obtained to be amplified to be used as a value in proportion to strain. In the invention, since dummy resistors 5 and the strain gauges 14, in which values of resistance are equal to each other in temperature dependency, are embedded in the hole 13 in the bolt to be adjacent to each other, the strain gauges 14 and the dummy resistors 5, which form a Wheatstone bridge, can be made equal to each other in temperature, so that temperature correction becomes possible. Also, the dummy resistors 5 are arranged so that sensitivity to strain is increased in a radial direction of the bolt. Since a force in the radial direction of the bolt is small as compared with a force in an axial direction, the dummy resistors 5 are hard to be influenced by strain as compared with the strain gauges 14, so that it is possible to accurately measure strain in the axial direction of the bolt. Thus, the strain gauges 14 are arranged to be lengthwise in the axial direction of the bolt and the dummy resistors 5 are arranged to be lengthwise in the radial direction of the bolt as shown in FIG. 5. Thereby, temperature correction is automatically made possible even in the case where the bolt involves temperature distribution. Also, the dummy resistors 5 may be arranged in the head of the bolt as shown in FIG. 6 in the case where temperature distribution is considerably small. In this case, strain generated in the head of the bolt 12 is small at the time of bolt clamping, so that use as dummy resistors is enabled. In addition, a change in resistance relative to a change in strain is smaller in the dummy resistors than in the strain gauges. Also, while the structures shown in FIGS. 2 and 6 are preferably formed on a silicon monocrystal substrate, they can be formed on other semiconductor monocrystal substrates.

Also, it is preferable to have a configuration of power supply with electromagnetic waves.

In the embodiment, voltage change from the Wheatstone bridge circuit 16 is converted into a digital signal through the group of strain sensor amplifiers and the analog/digital converter. The digital signal is converted into a radio wave signal through the communication control and the rectification.detection.modem circuit to be transmitted to a leader 18 from the antenna. On the other hand, a high-frequency signal for electric power fed from the leader 18 is received by the antenna 10 and smoothed by the rectification.detection.modem circuit to be converted into a DC power of constant voltage to be supplied as power supply to respective circuits for measurement of strain. That is, the power supply and the respective control circuits are formed on the same silicon substrate. According to the invention, electromagnetic wave energy radiated on the bolt 1 with a function of measuring strain from the leader 18 becomes a power supply, and therefore, the operation can be performed over a long term without consumption of a battery in order to operate the respective circuits for measurement of strain and a circuit for radio transmission. Therefore, there is an advantage that it is possible to perform measurement of an axial force of the bolt over a long term without exchange of the bolt from a bolt clamped part. Also, when electromagnetic waves are radiated so as to make electromagnetic wave energy a power supply, they normally generate electric potential differences in the strain gauges 14 externally mounted to the chip 15, the Wheatstone bridge circuit 16, and lead wires for connection thereof whereby noise is generated in the circuit. In the case where electromagnetic wave energy becomes a power supply, it is necessary to restrict power consumption, so that the Wheatstone bridge circuit 16 will be driven with a faint electric current, in which case a considerable decrease in accuracy of measurement is caused when noise is mixed in. In particular, mixing-in of noise causes a problem in the case where the operation is performed with electromagnetic wave energy supplied from outside. According to the invention, however, the strain gauge 14 and the dummy resistor 5, which are externally mounted to the chip 15, and lead wires for connection thereof are mounted in the hole 13 provided in the bolt 12, so that it is possible to prevent noise from being mixed in the circuit. Also, by electrically connecting the chip 15 and the bolt 12 in a direct-current manner or an alternating-current manner, electromagnetic energy can be efficiently changed to a power supply, and electromagnetic waves can be efficiently emitted.

As described above, the invention is the first to enable accurate and efficient measurement since it is possible to prevent noise from being mixed in the externally mounted strain gauges, which constitute a weak point of the circuit operating with electromagnetic wave energy as a power supply. That is, since the strain gauges 14 and the dummy resistors 5, which are externally mounted to the chip 15, and lead wires for connection thereof are mounted in the hole 13 provided in the bolt 12 to be put in a state of being surrounded by a conductor, there is an advantage that noise decreases. Also, it is desired that a power supply ground of the chip 15 and the bolt 12 be electrically connected in a direct-current manner or an alternating-current manner. That is, a power supply ground of the chip 15 and the bolt 12 may be electrically connected, or may be electrically connected as an alternating-current component through an insulating film. Thereby, the bolt 12 and the chip 15 are put at the same electric potential, so that when electromagnetic energy becomes a power supply and electromagnetic waves are emitted, an improvement in efficiency can be achieved.

Figure 7:
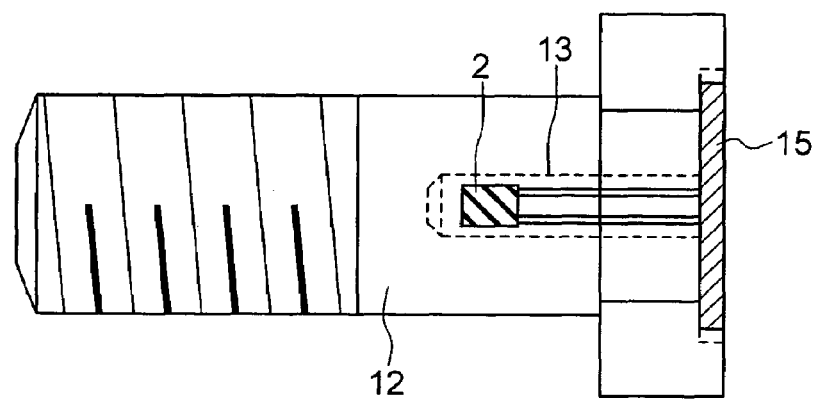
FIG. 7 is a cross sectional view showing a bolt with a function of measuring strain, according to a second embodiment of the invention.
Figure 8:
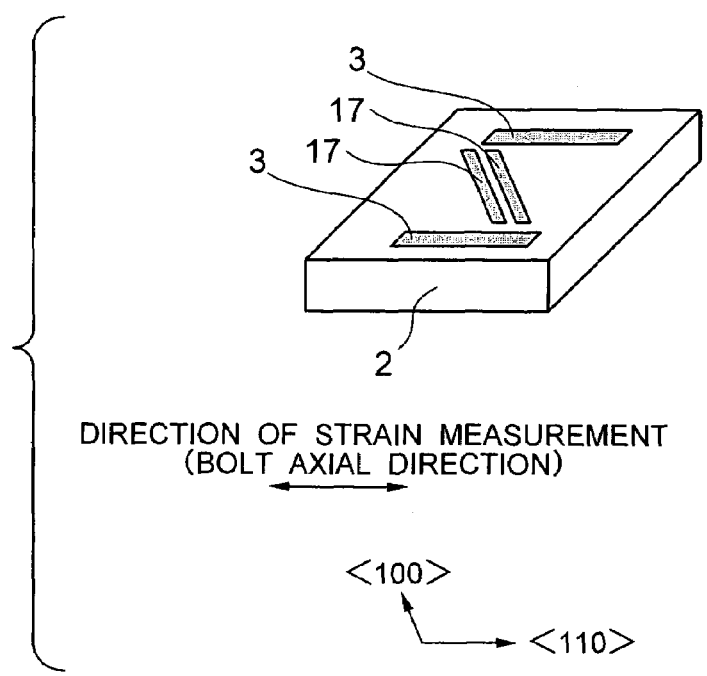
FIG. 8 is a perspective view showing a strain measuring part of the bolt with a function of measuring strain, according to the second embodiment of the invention.

A second embodiment of the invention will be described hereinafter with reference to FIGS. 7 to 26. FIG. 7 shows a bolt 1 with a function of measuring strain, according to the second embodiment of the invention. The bolt 1 with a function of measuring strain is characterized in that strain sensors 3 and dummy resistors 17 are formed in a common silicon monocrystal substrate 2. FIG. 8 shows the silicon substrate 2. The silicon substrate 2 makes, for example, a (001) plane a surface, and the strain sensors 3 and the dummy resistors 17 are provided by forming a diffusion layer on the surface. The diffusion layer on the surface of the silicon substrate 2 makes it possible to find strain as a change in resistance owing to the piezoresistance effect. Since sensitivity to strain can be heightened by orienting a lengthwise direction of the diffusion layer along a certain crystal orientation, the diffusion layer can be used as the strain sensors 3. Also, since sensitivity to strain can be lowered by forming a diffusion layer, of which a lengthwise direction becomes otherwise, such diffusion layer can be used as the dummy resistors 17. Since the strain sensors 3 and the dummy resistors 17 are formed in the common silicon substrate, there is also an advantage that the both become the same in temperature to enable an accurate temperature correction. Since a silicon substrate has a high thermal conductivity as compared with an insulating film, temperature of the bolt surface is liable to be transmitted to the strain sensors 3 and the dummy resistors 17 on the surface of the silicon substrate in the same manner, so that there is an advantage that no decrease in accuracy due to ununiformity of temperature is caused.

Also, according to the present embodiment, the strain sensors 3 and the dummy resistors 17 are formed in the same silicon substrate and connected to provide a Wheatstone bridge circuit 16. As described later in detail, it is desired that the strain sensors 3 and the dummy resistors 17 be formed by ion implantation of an impurity into the surface of the silicon substrate 2, whereby the strain sensors 3 and the dummy resistors 5 can be made in agreement with each other in value of resistance and temperature dependency of value of resistance, so that there is an advantage that even in the case where a Wheatstone bridge circuit 16 is formed, offset is hardly generated in output voltage thereof. Therefore, there is an advantage that it is unnecessary to perform trimming of value of resistance in a manufacturing process and thus the process can be simplified. Further, since a very small strain sensor and a Wheatstone bridge, which are of several hundreds of μm or less, can be realized in a manufacturing process of semiconductor devices, there is an advantage that they can be embedded in a bolt 12 having a small diameter.

Figure 9:
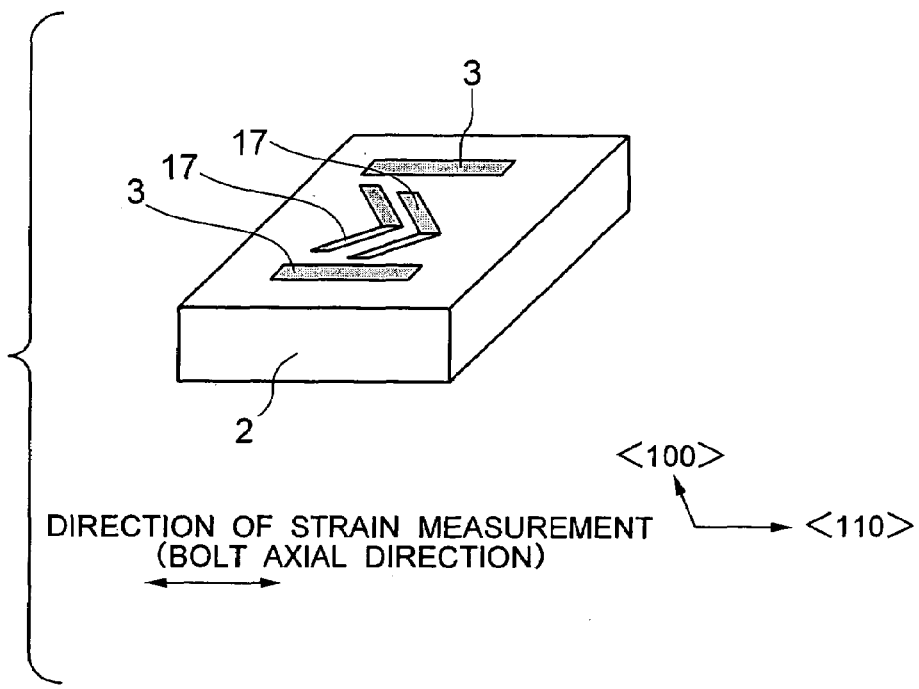
FIG. 9 is a perspective view showing the strain measuring part of the bolt with a function of measuring strain, according to the second embodiment of the invention.

FIG. 9 shows another case where strain sensors 3 and dummy resistors 17 are formed on a silicon substrate 2. In the Wheatstone bridge circuit 16, the strain sensors 3 are formed by diffusing a P-type impurity layer locally into the silicon substrate 2 and made lengthwise in a <110> direction. Also, the dummy resistors 17 are likewise formed by diffusing a P-type impurity layer locally into the silicon substrate and made V-shaped as shown in FIG. 9, and straight line segments, which form the V shape, are made lengthwise in a <100> direction. Further, the strain sensors 3 and the dummy resistors 17 are formed so as to have substantially the same value of resistance. Also, while the dummy resistors 17 are V-shaped, they are bent so that two straight line segments, which form the V shape, have the same length.

Figure 10:
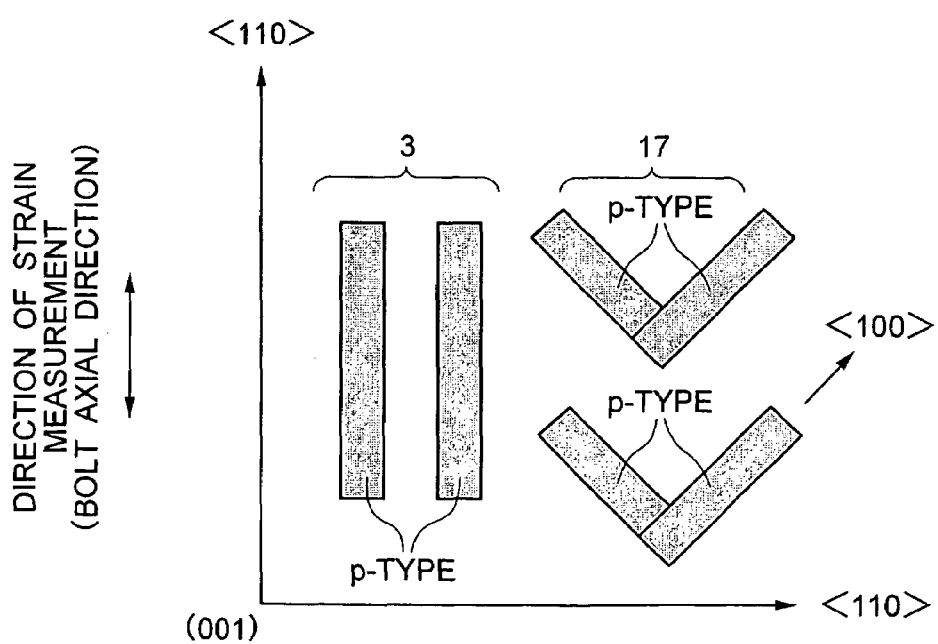
FIG. 10 is a view showing a bolt axial direction, a crystal orientation of a silicon substrate, and an arrangement of diffusion layers with respect to the strain measuring part of the bolt with a function of measuring strain, according to the second embodiment of the invention.

FIG. 10 shows the relationship between shapes of the strain sensors 3 and the dummy resistors 17 and the crystal orientation of the silicon substrate 2. There is an advantage that sensitivity to stress in a lengthwise direction can be increased by forming the strain sensors 3 from a P-type impurity diffusion layer to make the same lengthwise in the <110> direction. Also, since sensitivity to normal stress can be minimized by forming the dummy resistors 17 from a p-type impurity diffusion layer to make the same lengthwise in <100> and sensitivity to inplane shearing stress can be cancelled by forming the dummy resistors 17 to make the same V-shaped, the dummy resistors 17 can be further decreased in sensitivity. Also, since the strain sensors and the dummy resistors can be formed from the same p-type impurity layer, there is an advantage that the both can be made the same in value of resistance by forming the both in the same process at the same time. For example, when impurity layers of the both are formed by performing the process of ion implantation of a p-type impurity at the same time, substantially the same value of sheet resistance is obtained for the strain sensors 3 and the dummy resistors 17, so that output of the Wheatstone bridge circuit can be minimized in offset even when dispersion in manufacture is not taken account of. In this case, the processing of impurity diffusion is desirably performed in ion implantation and thereafter activation process since a dose of impurity is high in accuracy and the diffusion profile can be formed with good reproducibility.

Figure 11:
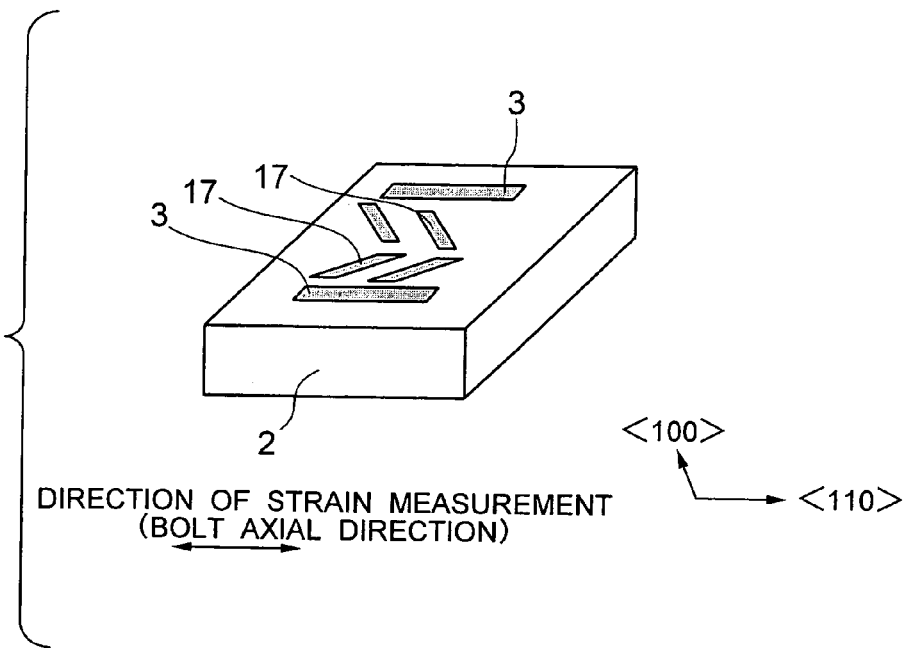
FIG. 11 is a perspective view showing the strain measuring part of the bolt with a function of measuring strain, according to the second embodiment of the invention.

Also, since the value of sheet resistance can be made the same by forming the strain sensors and the dummy resistors together from the same P-type impurity layer, there is an advantage that the value of resistance can be made substantially the same in temperature dependency. In addition, also in case of designing to make the strain sensors and the dummy resistors in disagreement with each other in impurity concentration, there is possibility of generation of some error in temperature correction and it is anticipated that deviation of the strain sensors 3 and the dummy resistors 17 in value of resistance disperses, but other effective effects can be obtained likewise. Also, instead of the V-shaped diffusion layers, the dummy resistors 17 may be formed, as shown in FIG. 11, by connecting diffusion layers, which are lengthwise in the <100> direction, by means of wires in a manner to consequently produce the same effect. In this case, it is desired that the connected diffusion layers of the dummy resistors 17 have the same value of resistance as that of the strain sensors 3. In this case, there is produced an advantage that the strain sensors and the dummy resistors can be made free in layout.

Figure 12:
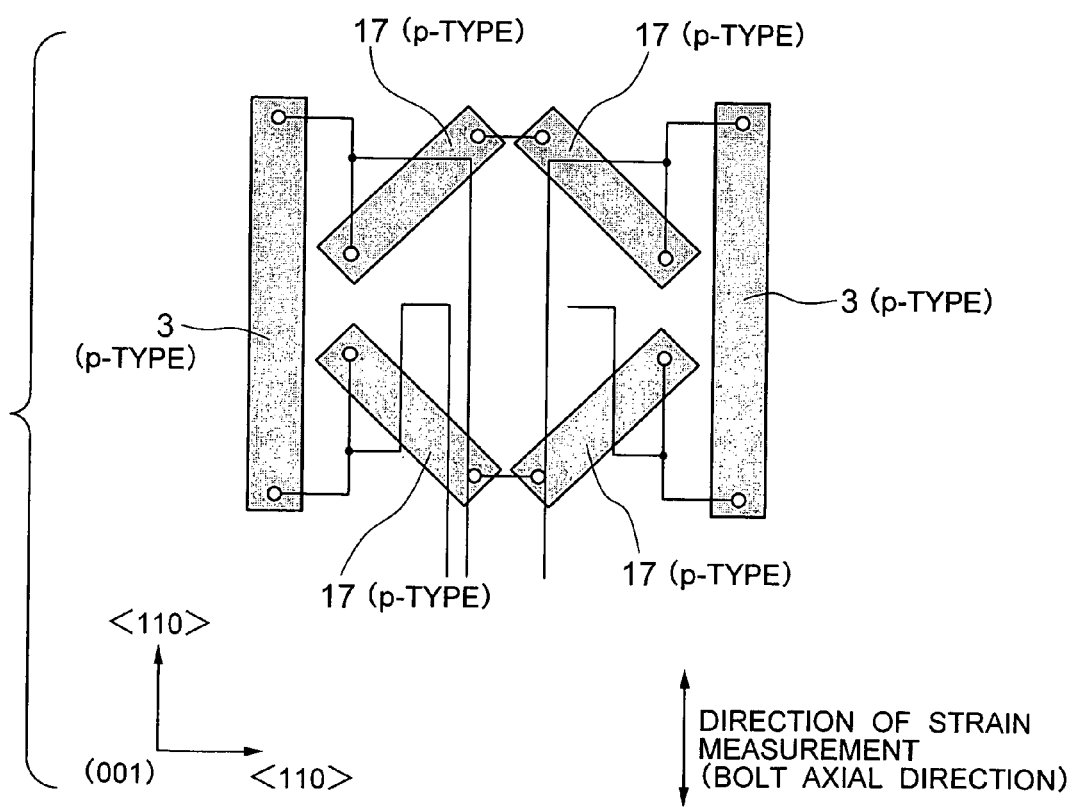
FIG. 12 is a view showing a bolt axial direction, an arrangement of diffusion layers, and an example of wiring with respect to the strain measuring part of the bolt with a function of measuring strain, according to the second embodiment of the invention.

FIG. 12 shows connection between the arrangement of the diffusion layers shown in FIG. 11 and bridge wires 18. In an example of FIG. 12, the arrangement of the diffusion layers and the bridge wires 18 are taken account of so as to make lengths of the bridge wires 18 consistent as far as possible. The respective diffusion layers may be arranged as shown in FIGS. 9 and 11 such that directions, in which the V shapes of the dummy resistors 17 are opened, are consistent, in which case there is an advantage that it is possible to decrease an area occupied by the Wheatstone bridge circuit 16. Also, while the two strain sensors 3 are arranged apart from each other in a manner to interpose the dummy resistors 17 in FIGS. 8, 9, and 11, the two strain sensors may be arranged side by side. Also, in this case, it is possible to decrease an occupied area in terms of layout. Also, since the respective bridge wires 18 are not made largely different in length by arranging the wires so that mirror symmetry is kept as far as possible as in the bridge wires 18 shown in FIG. 12, deviation of the four bridge resistors in resistance can be reduced.

Figure 13:
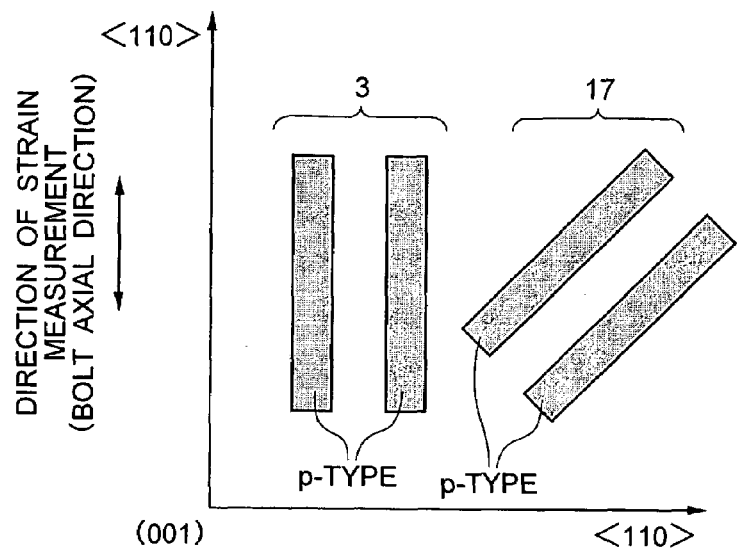
FIG. 13 is a view showing a bolt axial direction, a crystal orientation of a silicon substrate, and an arrangement of diffusion layers with respect to the strain measuring part of the bolt with a function of measuring strain, according to the second embodiment of the invention.
Figure 14:
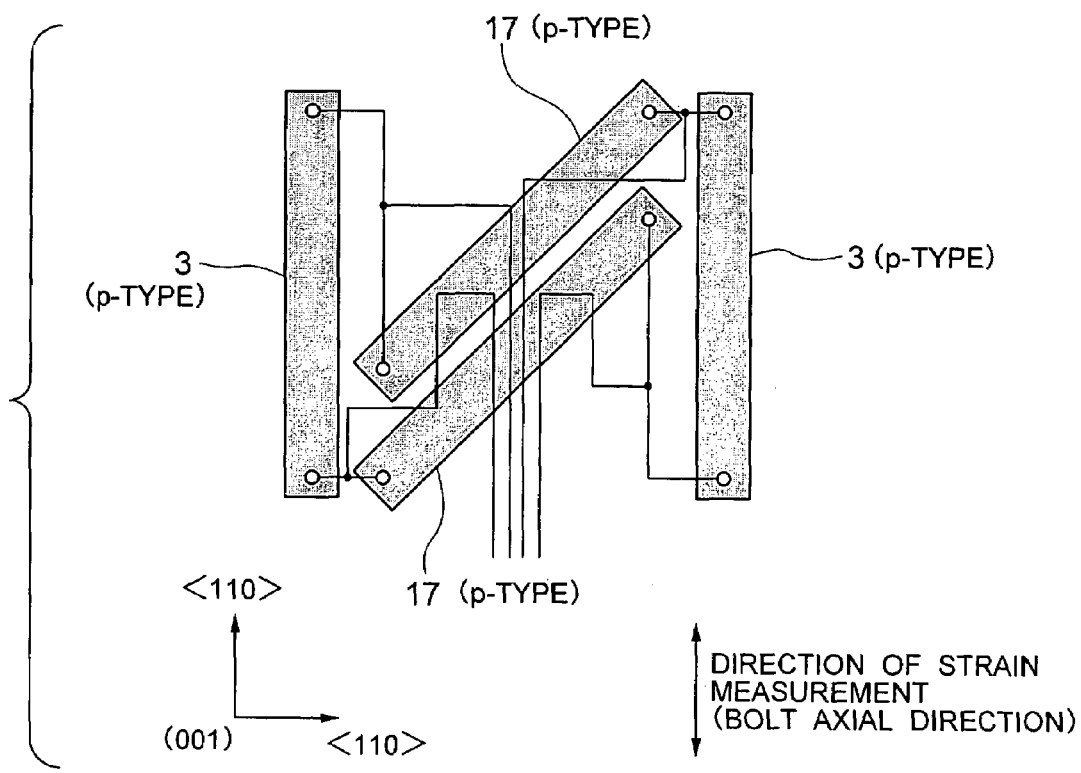
FIG. 14 is a view showing a bolt axial direction, an arrangement of diffusion layers, and an example of wiring with respect to the strain measuring part of the bolt with a function of measuring strain, according to the second embodiment of the invention.

Also, also in the case where the dummy resistors are arranged not in a V-shape but in straight lines, they become liable to be somewhat influenced by inplane shearing stress, but other effective effects can be obtained likewise. FIG. 13 shows the relationship between shapes of strain sensors 3 and dummy resistors 17 and the crystal orientation of the silicon substrate 2. There is an advantage that sensitivity to longitudinal stress can be increased by forming the strain sensors 3 from a p-type impurity diffusion layer to make the same lengthwise in the <110> direction. Also, sensitivity to normal stress can be minimized by forming the dummy resistors 17 from a P-type impurity diffusion layer to make the same lengthwise in <110>. While the present method cannot cancel an inplane shearing stress component, it has an advantage that layout becomes simple since the dummy resistors 7 do not define a V shape. It is difficult to form the dummy resistors 17 in a V shape and to make its value of resistance in accurate agreement with the strain sensors 3, and in this point the method shown in FIG. 13 is simple and also has an advantage that accurate agreement with a value of resistance of the strain sensor 3 is possible. In an example shown in FIG. 14, an arrangement of the diffusion layers and bridge wires 18 is taken into consideration so as to make lengths of the bridge wires 18 consistent with one another as far as possible. Also, while it has been described that the strain sensors are formed in the <110> direction and the dummy resistors are formed in the <100> direction, this is an ideal state and an effect is adequately produced even in the case where angular deviation is generated in manufacture. That is, an effect is produced when the strain sensors are arranged more nearly in the <110> direction than in the <100> direction and the dummy resistors are arranged more nearly in the <100> direction than in the <110> direction.

Figure 15:
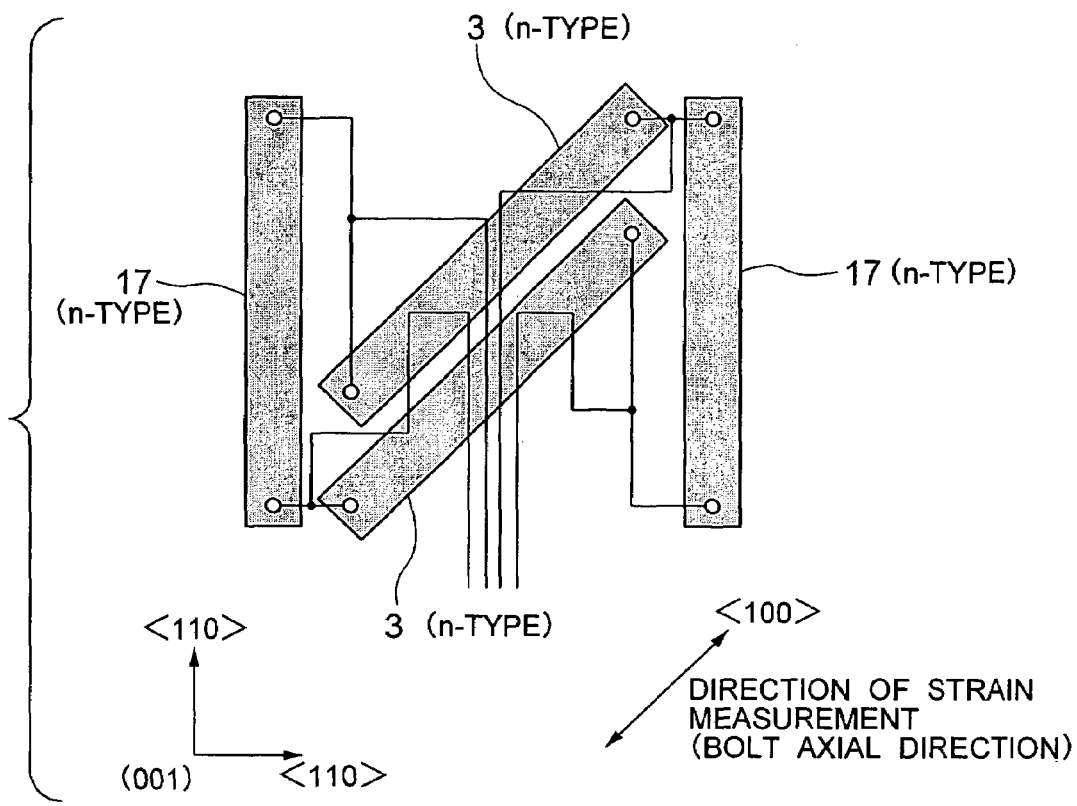
FIG. 15 is a view showing a bolt axial direction, an arrangement of diffusion layers, and an example of wiring with respect to the strain measuring part of the bolt with a function of measuring strain, according to the second embodiment of the invention.
Figure 16:
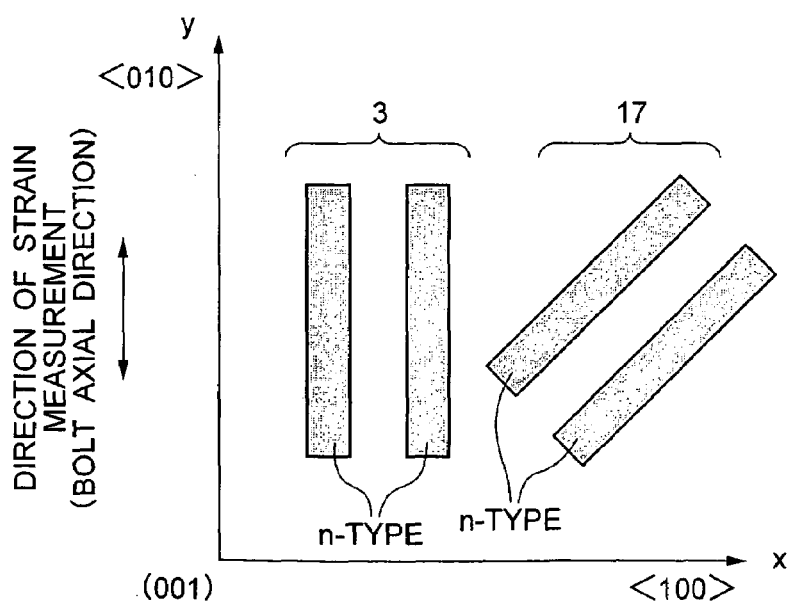
FIG. 16 is a view showing a bolt axial direction, a crystal orientation of a silicon substrate, and an arrangement of diffusion layers with respect to the strain measuring part of the bolt with a function of measuring strain, according to the second embodiment of the invention.
Figure 17:
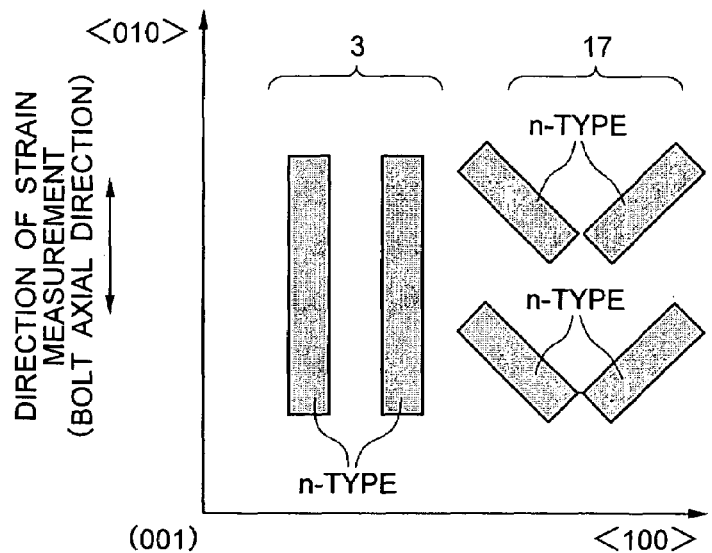
FIG. 17 is a view showing a bolt axial direction, a crystal orientation of a silicon substrate, and an arrangement of diffusion layers with respect to the strain measuring part of the bolt with a function of measuring strain, according to the second embodiment of the invention.
Figure 18:
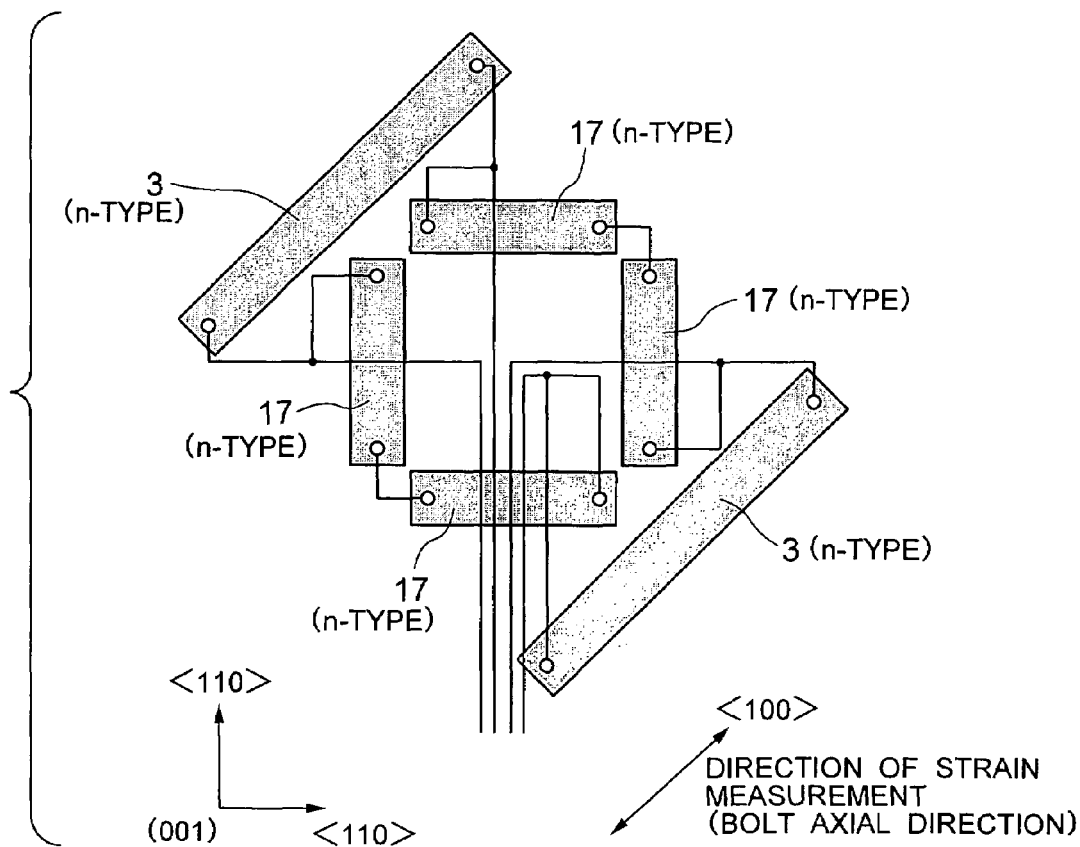
FIG. 18 is a view showing a bolt axial direction, an arrangement of diffusion layers, and an example of wiring with respect to the strain measuring part of the bolt with a function of measuring strain, according to the second embodiment of the invention.
Figure 19:
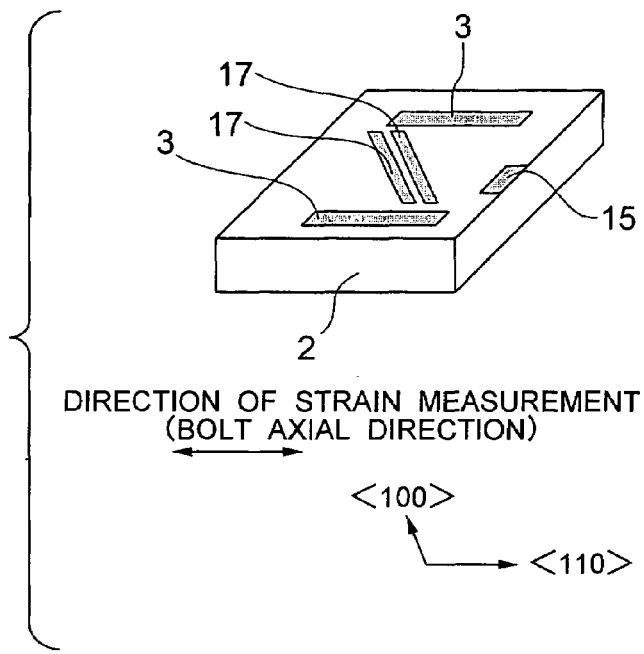
FIG. 19 is a perspective view showing the strain measuring part of the bolt with a function of measuring strain, according to the second embodiment of the invention.

FIG. 15 shows an example, in which strain sensors 3 and dummy resistors 17 are formed from an n-type impurity diffusion layer. Also, FIG. 16 shows the relationship between shapes of the strain sensors 3 and the dummy resistors 17 and the crystal orientation of a silicon substrate 2. In this case, the strain sensors 3 are formed to be lengthwise in the <100> direction and the dummy resistors 17 are formed to be lengthwise in the <110> direction. Also, in the case where the V-shaped dummy resistors 17 as shown in FIGS. 17 and 18 are used in order to cancel an inplane shearing stress component, the dummy resistors 17 are hardly influenced by a multiaxial stress component, so that measurement with high accuracy becomes possible. In the case where the strain sensors 3 shown in FIGS. 15, 16, 17 and 18 are used, strain is measured in the <100> direction. Accordingly, a mark 15 indicative of a direction of strain measurement is formed so as to indicate the <100> direction. Since a worker hardly knows a direction of strain measurement in a manufacturing process in the case where a circuit and wiring are formed perpendicular to and in parallel to the <110> direction as in ordinary semiconductor devices, it is desirable to put the mark 15 as shown in FIG. 19.

In the case where a n-type impurity diffusion layer is used to form the strain sensors 3 and the dummy resistors 17 as in the above cases, sensitivity is somewhat lowered as compared with the case where a p-type impurity diffusion layer is used, but a p-type impurity is not diffused only for the strain sensors 3 in the case where other circuits are formed from n-type semiconductor devices, or the like, so that there is an advantage that manufacture becomes easy. Also, silicon crystal has a cleavage plane in <111> and there is an advantage that by orienting a direction of strain measurement in <100>, crack is hardly generated in case of measuring a large amount of strain.

Figure 20:
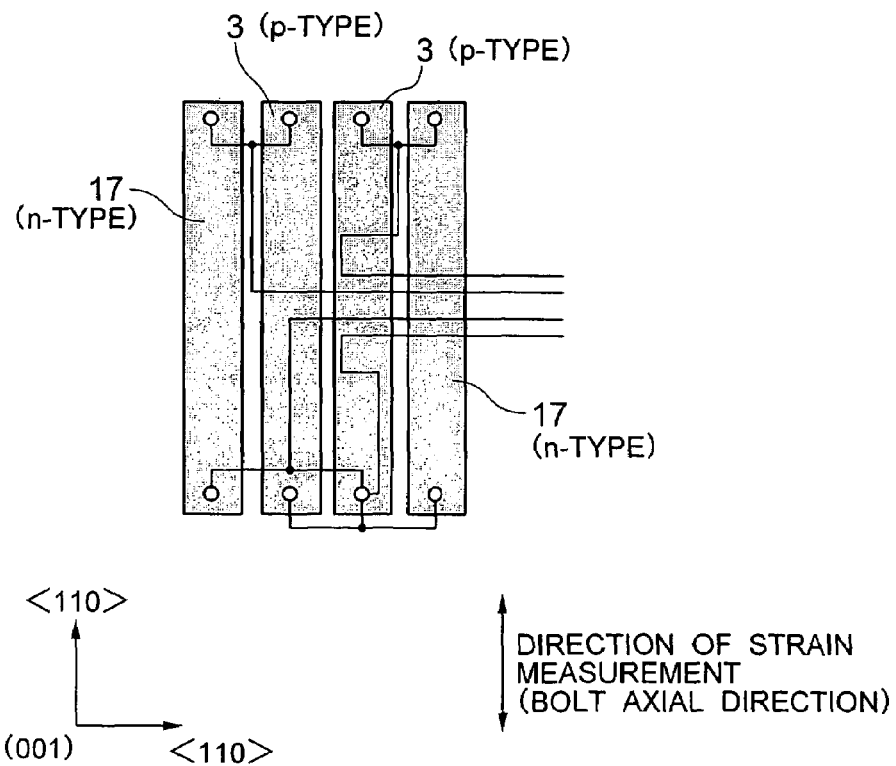
FIG. 20 is a view showing a bolt axial direction, an arrangement of diffusion layers, and an example of wiring with respect to the strain measuring part of the bolt with a function of measuring strain, according to the second embodiment of the invention.
Figure 21:
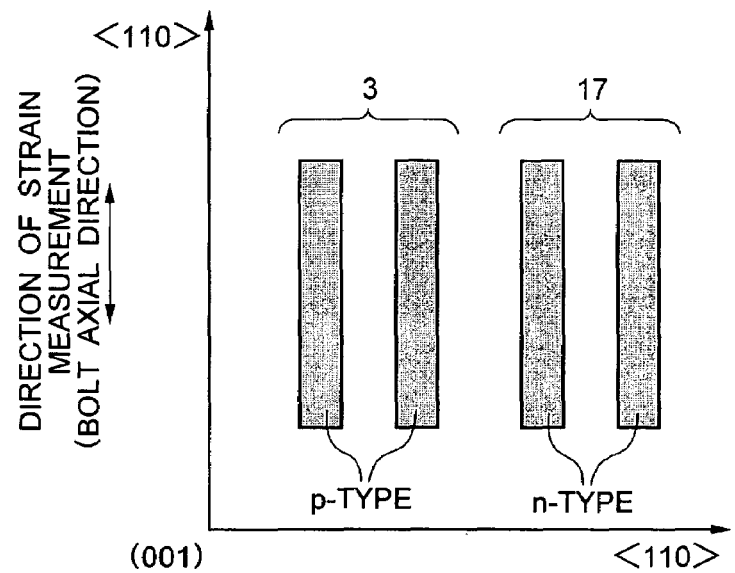
FIG. 21 is a view showing a bolt axial direction, a crystal orientation of a silicon substrate, and an arrangement of diffusion layers with respect to the strain measuring part of the bolt with a function of measuring strain, according to the second embodiment of the invention.

FIG. 20 shows an example, in which strain sensors 3 are formed from a p-type impurity diffusion layer and dummy resistors 17 are formed from an n-type impurity diffusion layer. Also, FIG. 21 shows the relationship between shapes of the strain sensors 3 and the dummy resistors 17 and the crystal orientation of a silicon substrate 2. In this case, both the strain sensors 3 and the dummy resistors 17 are formed to be lengthwise in the <110> direction and a direction of strain measurement is also oriented in <110>. Since the strain sensors 3 are formed from a p-type impurity diffusion layer in the example, there is an advantage that sensitivity is high. Also, since the strain sensors 3 and the dummy resistors 17 can be formed in parallel to each other, there is an advantage that it is possible to decrease an area occupied by the Wheatstone bridge circuit 16. Therefore, it is possible to make a whole chip small in size with the result that it is possible to achieve reduction in cost.

Figure 22:
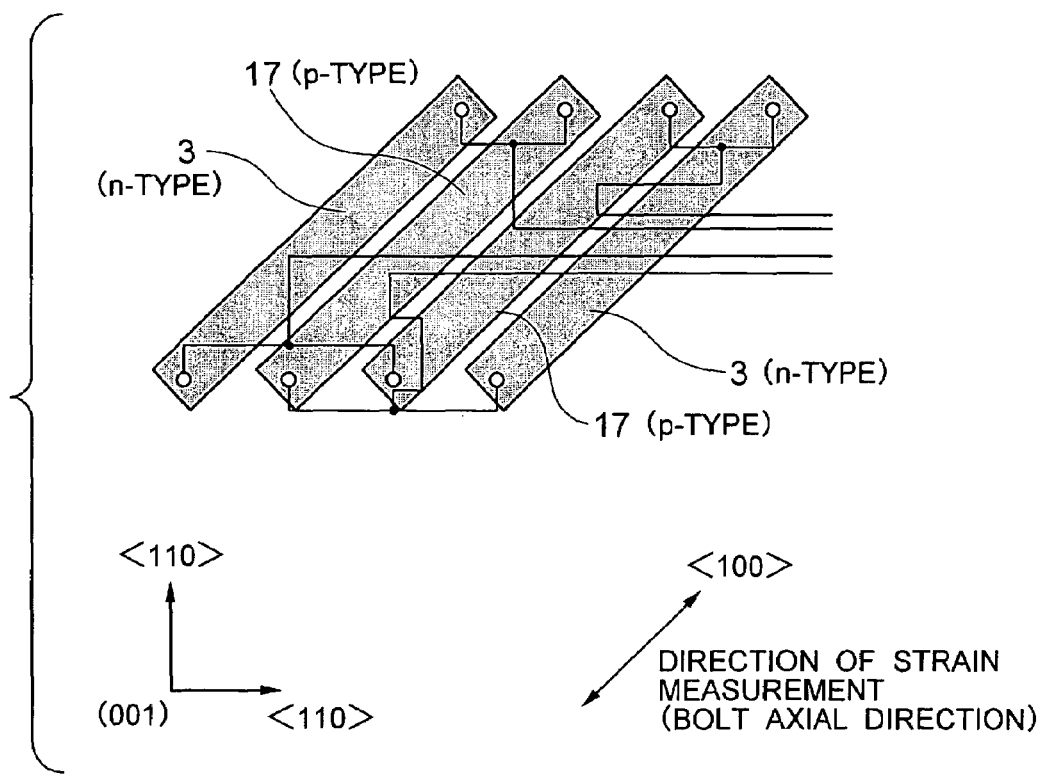
FIG. 22 is a view showing a bolt axial direction, an arrangement of diffusion layers, and an example of wiring with respect to the strain measuring part of the bolt with a function of measuring strain, according to the second embodiment of the invention.
Figure 23:
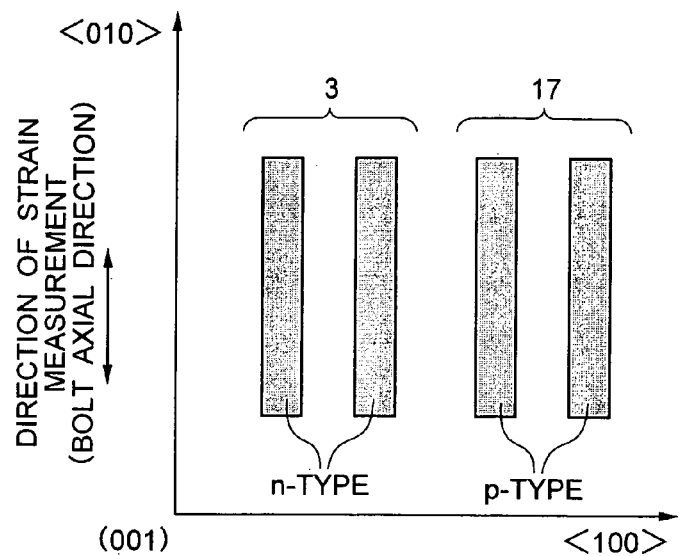
FIG. 23 is a view showing a bolt axial direction, a crystal orientation of a silicon substrate, and an arrangement of diffusion layers with respect to the strain measuring part of the bolt with a function of measuring strain, according to the second embodiment of the invention.

FIG. 22 shows an example, in which strain sensors 3 are formed from a n-type impurity diffusion layer and dummy resistors 17 are formed from a p-type impurity diffusion layer. FIG. 23 shows the relationship between shapes of the strain sensors 3 and the dummy resistors 17 and the crystal orientation of a silicon substrate 2. In this case, both the strain sensors 3 and the dummy resistors 17 are formed to be lengthwise in the <100> direction and a direction of strain measurement is also oriented in <100>. Since sensitivity of the dummy resistors 17 to stresses in respective directions is low, there is an advantage that measurement with high accuracy becomes possible, so that the example is usable in the case where a stress state being measured gets largely out of 1 axis. Also, since the strain sensors 3 and the dummy resistors 17 can be formed in parallel to each other, there is an advantage that it is possible to decrease an area occupied by the Wheatstone bridge circuit 16.

Figure 24:
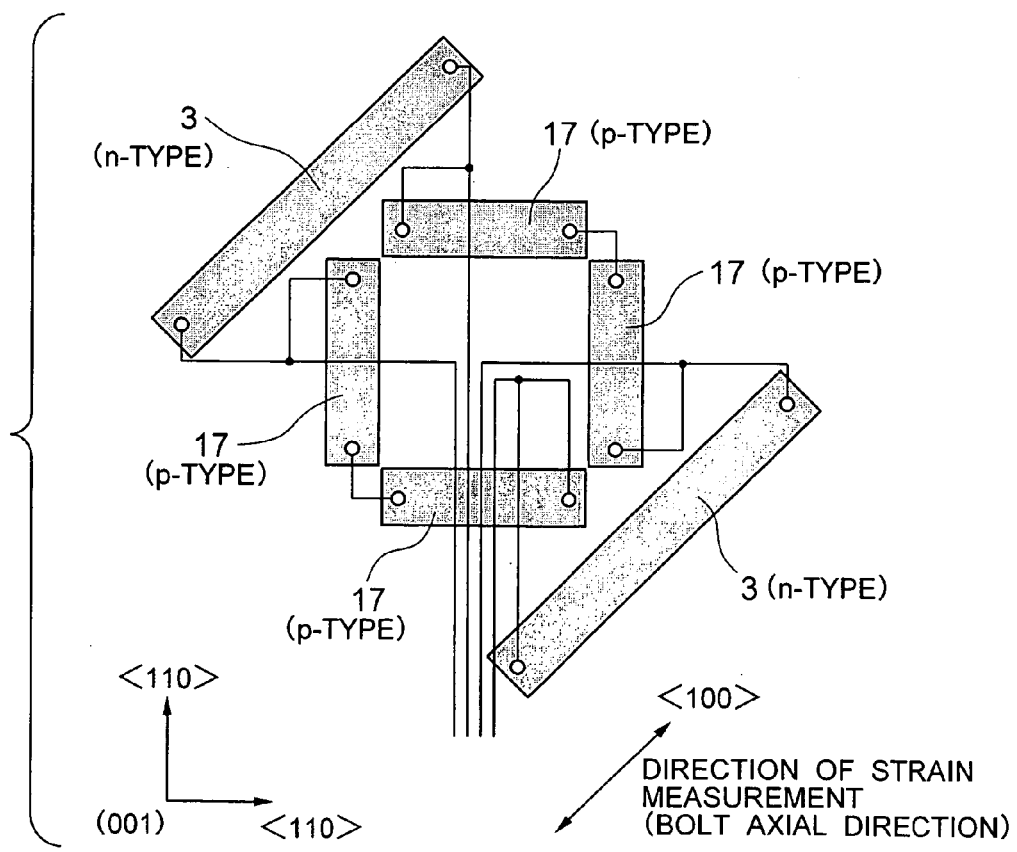
FIG. 24 is a view showing a bolt axial direction, an arrangement of diffusion layers, and an example of wiring with respect to the strain measuring part of the bolt with a function of measuring strain, according to the second embodiment of the invention.
Figure 25:
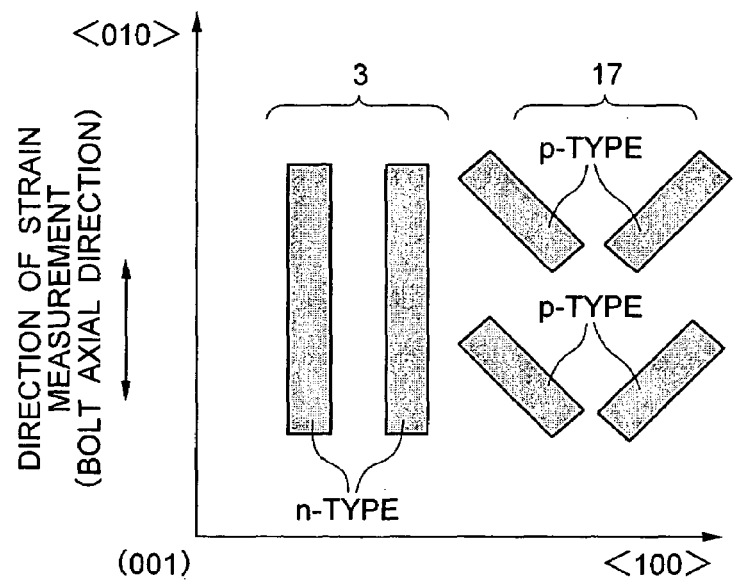
FIG. 25 is a view showing a bolt axial direction, a crystal orientation of a silicon substrate, and an arrangement of diffusion layers with respect to the strain measuring part of the bolt with a function of measuring strain, according to the second embodiment of the invention.
Figure 26:
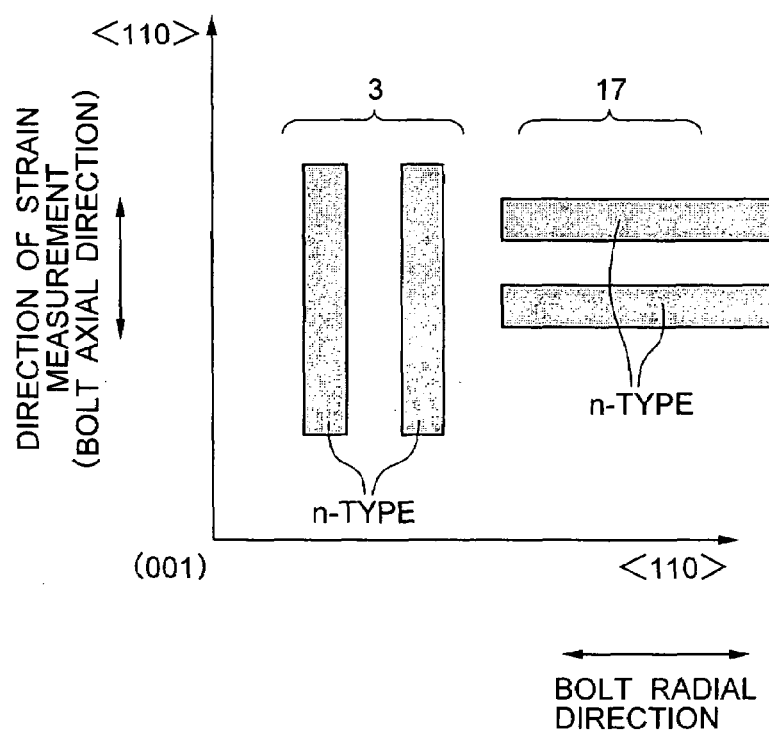
FIG. 26 is a view showing a bolt axial direction, a crystal orientation of a silicon substrate, and an arrangement of diffusion layers with respect to the strain measuring part of the bolt with a function of measuring strain, according to the second embodiment of the invention.

Also, FIG. 24 shows an example, in which strain sensors 3 are formed from an n-type impurity diffusion layer and dummy resistors 17 are formed from a p-type impurity diffusion layer. Also, FIG. 25 shows the relationship between shapes of the strain sensors 3 and the dummy resistors 17 and the crystal orientation of a silicon substrate 2. In this case, the strain sensors 3 are formed to be lengthwise in the <100> direction, the dummy resistors 17 are formed to be lengthwise in the <110> direction, and a direction of strain measurement is also oriented in <100>. In this case, since sensitivity of the strain sensors 3 in the <100> direction is high and sensitivity of the dummy resistors 17 to respective stress components is low, measurement with high accuracy becomes possible. Also, the dummy resistors may be formed so that a lengthwise direction of the diffusion layer in the strain sensors and a lengthwise direction of the diffusion layer in the dummy resistors are made substantially perpendicular to each other as shown in FIG. 26. That is, the strain sensors are arranged so as to put a lengthwise direction of its diffusion layer in an axial direction of the bolt 12 and the dummy resistors 5 are arranged so as to make a lengthwise direction of its diffusion layer in agreement with a radial direction of the bolt 12. In this case, since a certain amount of strain is generated in the radial direction of the bolt, the dummy resistors do not make perfect dummies but come fairly within a range of practical use since there is generated a large difference in value. Also, while FIG. 26 exemplarily shows the case where an n-type impurity diffusion layer is used, a p-type impurity diffusion layer may be used, and further a combination of both an n-type impurity diffusion layer and a p-type impurity diffusion layer may be used.

In any one of the cases, voltage from the Wheatstone bridge circuit 16 is supplied to the chip 15 through a lead wire and converted into a digital signal by the group of strain sensor amplifiers and the analog/digital converter in the chip 15. The digital signal is converted into a radio wave signal through the communication control and the rectification.detection.modem circuit in the chip 15 to be transmitted to the leader 17 from the antenna 10. On the other hand, a high frequency signal for electric power fed from the leader 17 is received by the antenna 10 and smoothed by the rectification.detection.modem circuit to be made a DC power of constant voltage to be supplied as power supply to respective circuits for measurement of strain. Also, in the second embodiment of the invention, since electromagnetic energy provides a power supply in non-contact manner like the first embodiment, there is an advantage that the service life is not shortened due to consumption of a battery and even in the case where electricity consumption of the strain sensors is minimized in order to provide for driving with electromagnetic energy, an operation can be performed without influence of noise when electromagnetic energy is given and received. Further, there is also an advantage that measurement with accuracy becomes possible when temperature distribution is involved in the bolt.

Figure 27:
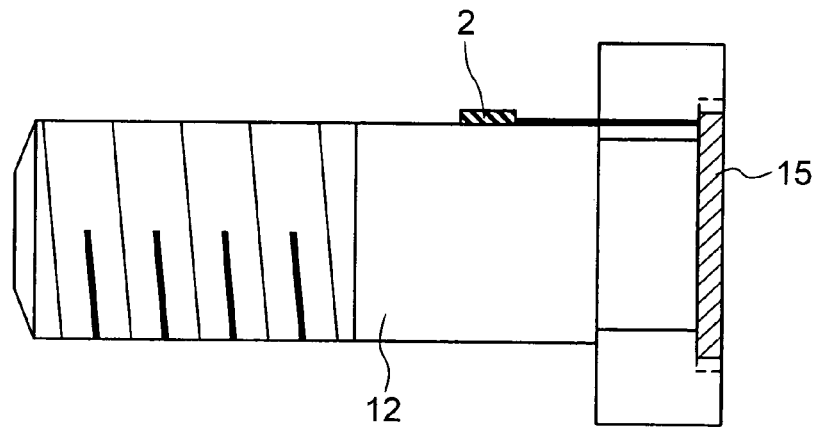
FIG. 27 is a cross sectional view showing a bolt with a function of measuring strain, according to a third embodiment of the invention.
Figure 28:
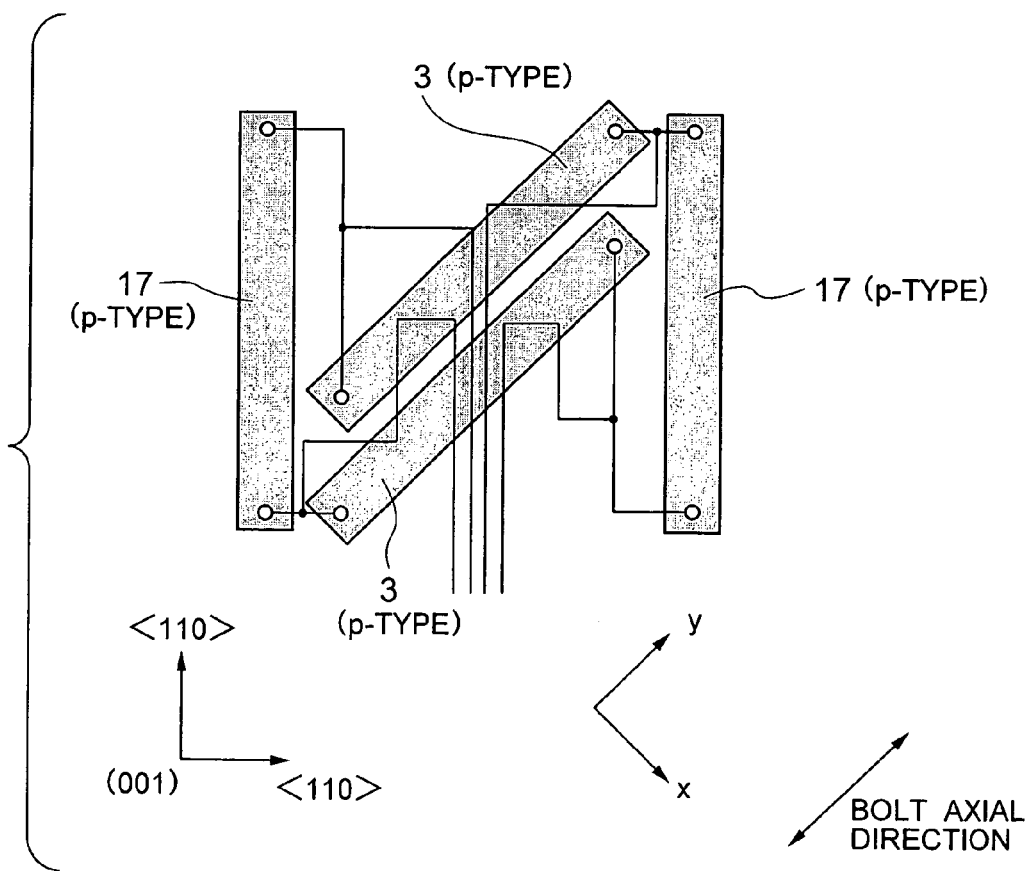
FIG. 28 is a view showing a bolt axial direction, an arrangement of diffusion layers, and an example of wiring with respect to a strain measuring part of the bolt with a function of measuring strain, according to the third embodiment of the invention.
Figure 29:
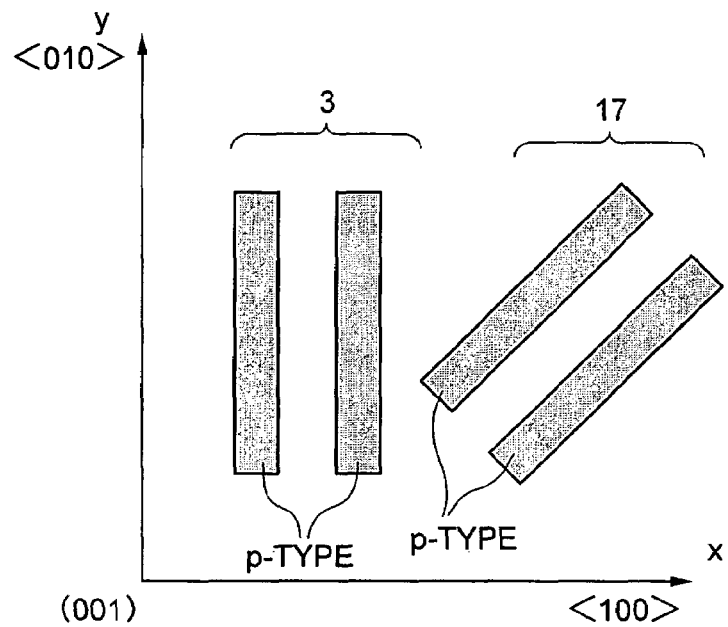
FIG. 29 is a view showing a bolt axial direction, a crystal orientation of a silicon substrate, and an arrangement of diffusion layers with respect to the strain measuring part of the bolt with a function of measuring strain, according to the third embodiment of the invention.

A third embodiment of the invention will be described hereinafter with reference to FIGS. 27 to 31. FIG. 27 shows a bolt 1 with a function of measuring strain, according to the third embodiment of the invention. The bolt 1 with a function of measuring strain, according to the embodiment, has a feature in that torque acting on a bolt 12 is measured by forming strain sensors 3 and dummy resistors 5 in a common silicon monocrystal substrate 2 to arrange the same on a side of the bolt 12. As shown in FIG. 27, the silicon substrate 2 is arranged on the side of the bolt 12, and the silicon substrate 2 is formed with the strain sensors 3 and the dummy resistors 17. FIG. 28 shows a case where the strain sensors 3 and the dummy resistors 17 are formed from a p-type impurity diffusion layer. Also, FIG. 29 shows the relationship between shapes of the strain sensors 3 and the dummy resistors 17 and the crystal orientation of the silicon substrate 2. In this case, the strain sensors 3 are formed to be lengthwise in the <100> direction, and the dummy resistors 17 are formed to be lengthwise in the <110> direction. It is possible to measure τxy in a xy coordinate system as shown in FIG. 28.

Figure 30:
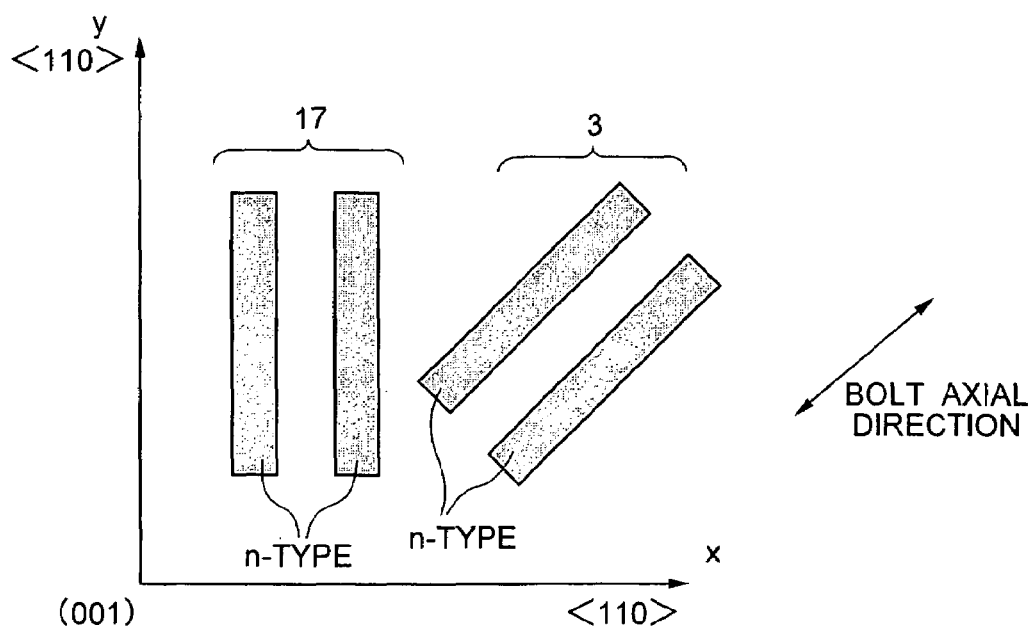
FIG. 30 is a view showing a bolt axial direction, a crystal orientation of a silicon substrate, and an arrangement of diffusion layers with respect to the strain measuring part of the bolt with a function of measuring strain, according to the third embodiment of the invention.
Figure 31:
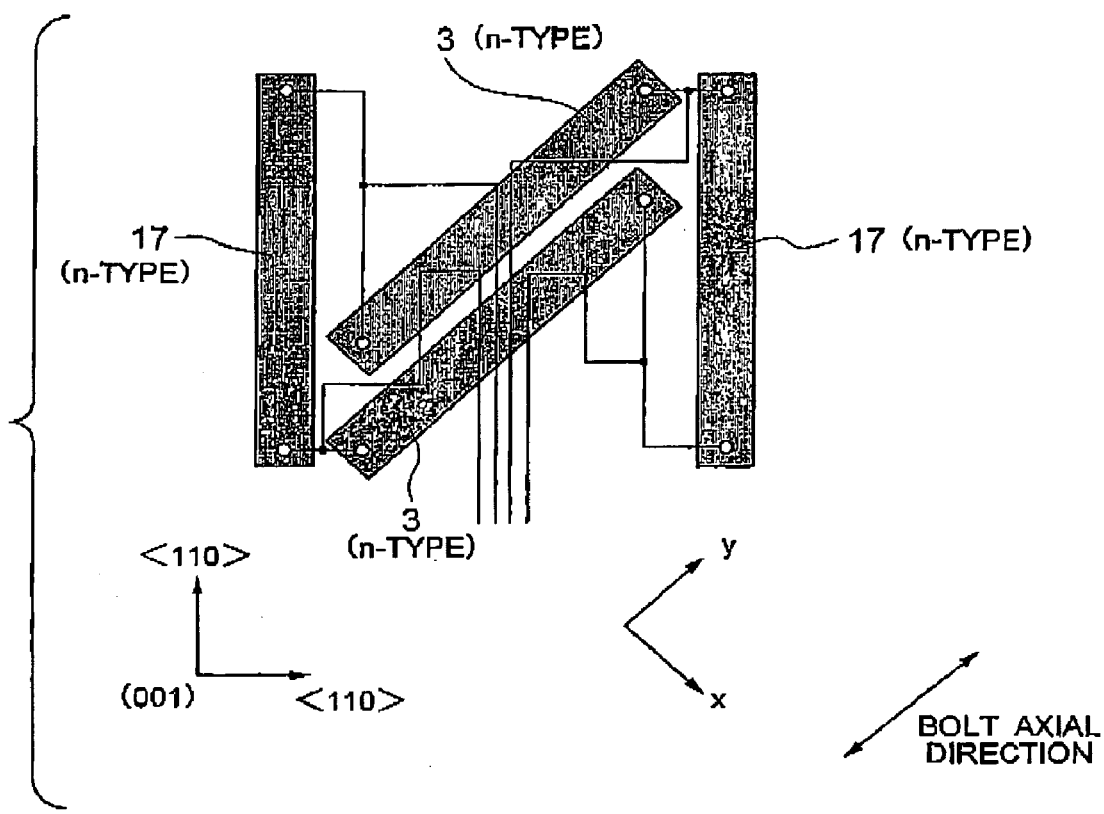
FIG. 31 is a view showing a bolt axial direction, an arrangement of diffusion layers, and an example of wiring with respect to the strain measuring part of the bolt with a function of measuring strain, according to the third embodiment of the invention.

Further, FIG. 30 exemplarily shows the case where strain sensors 3 and dummy resistors 17 are formed from an n-type impurity diffusion layer. Also, FIG. 31 shows the relationship between shapes of the strain sensors 3 and the dummy resistors 17 and the crystal orientation of a silicon substrate 2. In this case, the strain sensors 3 are formed to be lengthwise in the <100> direction, and the dummy resistors 17 are formed to be lengthwise in the <110> direction. Then it is possible to measure τxy in a xy coordinate system as shown in FIG. 31. That is, there is an advantage that sensitivity to a normal stress component is small and sensitivity only to τxy is large. By arranging this on a side of a bolt 12, it becomes possible to measure torque on the bolt.

In addition, it is possible to provide that configuration, in which both temperature and strain are measured.

Figure 32A:
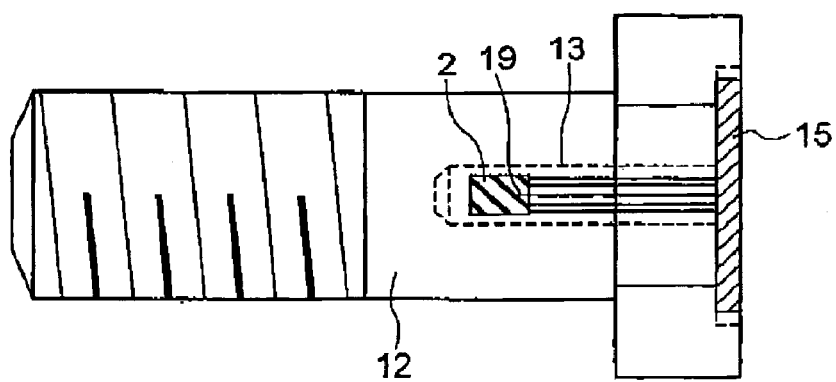
FIG. 32A is a cross sectional view showing a bolt with a function of measuring strain, according to a fourth embodiment of the invention, to which a function of temperature measurement is added.
Figure 32B:
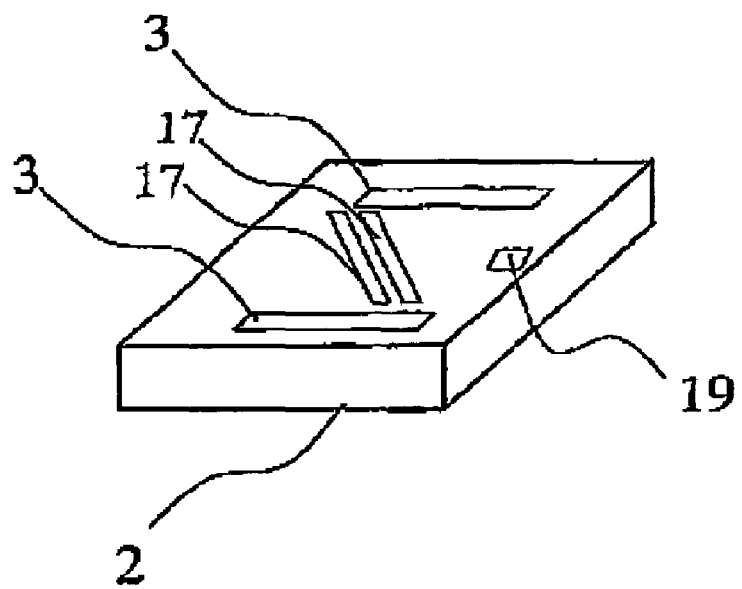
FIG. 32B is a view illustrating the strain measuring part of the bolt with the function of measuring strain, according to the fourth embodiment of the invention.
Figure 32C:
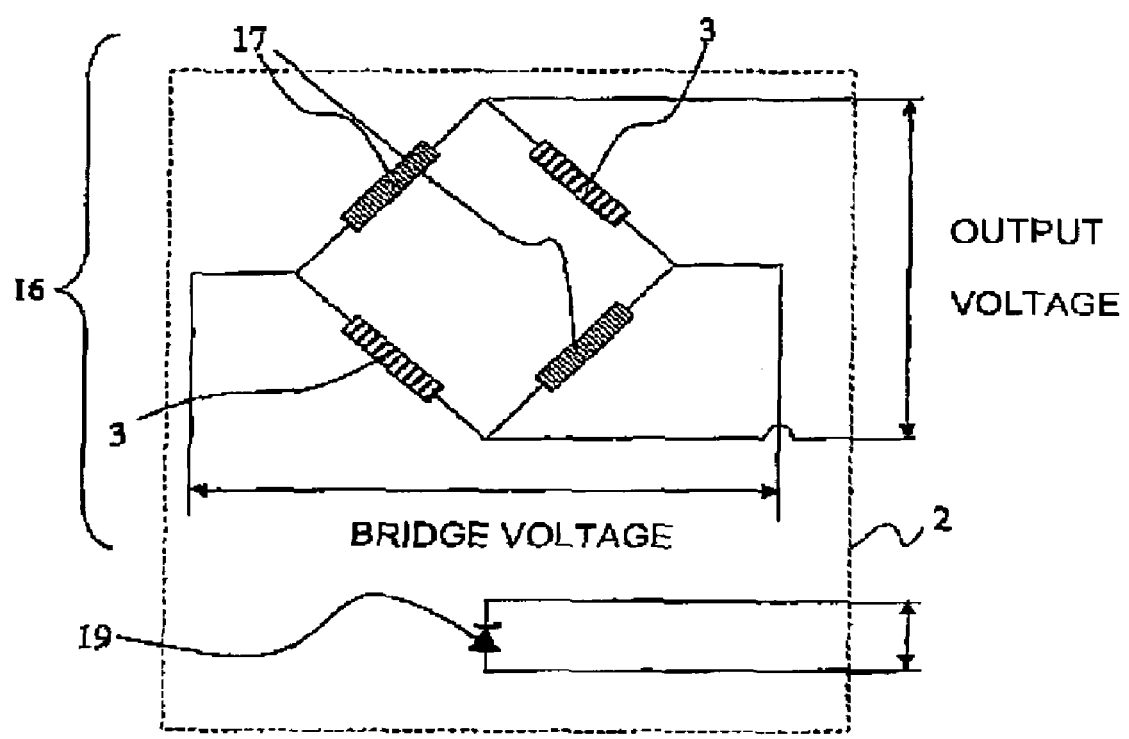
FIG. 32C is a circuit diagram illustrating a Wheatstone bridge related to the bolt with a function of measuring strain, according to the fourth embodiment of the invention.

A fourth embodiment of the invention will be described hereinafter with reference to FIGS. 32A-32C (collectively FIG. 32). A bolt 1 with a function of measuring strain, according to the embodiment, has a feature in that strain sensors 3 and dummy resistors 5 are formed in the same silicon monocrystal substrate 2 and a temperature sensor 19 is also formed in the silicon monocrystal substrate 2. Thereby, there is an advantage that it is possible to measure temperature as well as an axial force of a bolt 12. While the strain sensors 3 and the dummy resistors 5 in the silicon monocrystal substrate 2 are formed from an impurity diffusion layer, a junction of a p-type impurity and an n-type impurity is likewise formed in the silicon monocrystal substrate 2 to form a diode, which becomes use of to enable measurement of temperature. That is, impurities are diffused in the silicon monocrystal substrate 2 to enable formation of the temperature sensor 19, the strain sensors 3, and the dummy resistors 5. There is an advantage that the temperature sensor 19 can also be formed additionally without a change in a manufacturing process Also, on account of formation from a monocrystal silicon, there is an advantage that thermal conduction is good to enable measurement of temperature with high accuracy.

As described above, there is also an advantage as shown in the second to fourth embodiments that a bolt is not reduced in strength by forming an impurity diffusion layer in a silicon substrate to use the same as strain sensors 3 and embedding the strain sensors into a hole formed in an axial direction of the bolt. Since the technique of forming an impurity diffusion layer in a silicon substrate can make use of the semiconductor manufacturing technology, formation is possible with an accuracy of submicron or less. Therefore, since sensors themselves can be formed to be very small, it suffices that the hole 13 be very thin, so that measurement becomes possible without reduction in strength of the bolt. In particular, such configuration becomes effective in case of being formed in a bottom of a bolt as shown in FIG. 3 and in case of a bolt having a small diameter. Also, the same effect is produced also even in the case where the temperature sensor 19 is formed in the same silicon substrate since the strain sensors and the temperature sensor can be formed to be very small.

Figure 33:
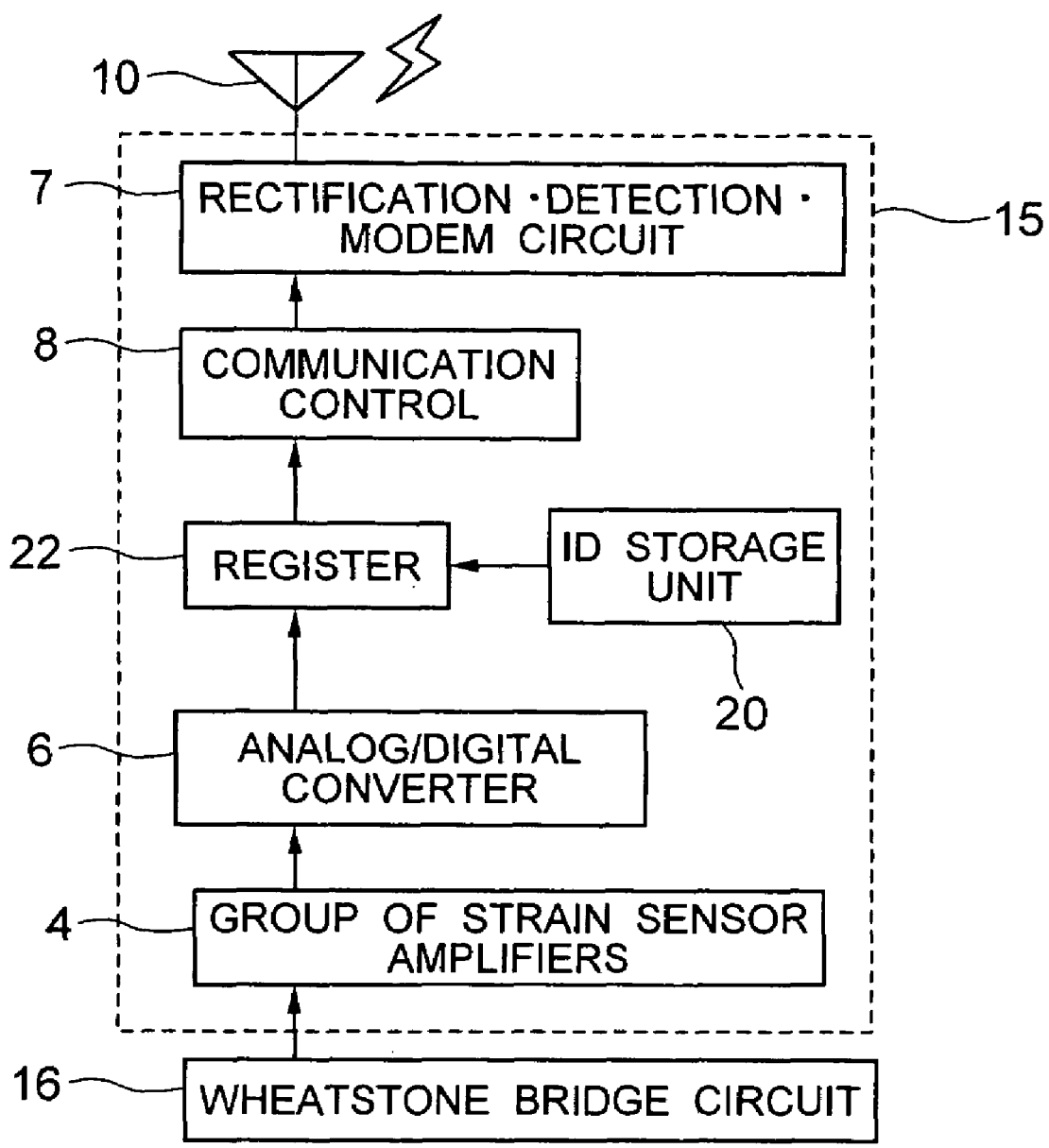
FIG. 33 is a block diagram illustrating a construction of a bolt with a function of measuring strain, according to a fifth embodiment of the invention.

A fifth embodiment of the invention will be described hereinafter with reference to FIGS. 33 to 35. FIG. 33 shows a bolt 1 with a function of measuring strain, according to the fifth embodiment of the invention. According to the embodiment, an ID number inherent in a bolt can be sequentially transmitted together with a value of strain. A feature resides in the provision of an ID storage unit 20, in which ID numbers are stored. Radio waves transmitted from the leader 18 are received and smoothed to make a power source to activate the strain sensors 3 and the group of strain sensor amplifiers 4. A variation of resistance read and amplified is converted into a digital value by the analog/digital converter 12 to be once stored in a register 22 together with an ID number, which is stored in the ID storage unit 20, and sequentially transmitted by the communication control 8 and the rectification.detection.modem circuit 7. According to the present embodiment, since an ID number together with an amount of strain can be received by the leader 18, there is an advantage that the relationship between respective volts and measured values becomes easy to grasp even in the case where a plurality of bolts 1 with a function of measuring strain are present. For example, since strain in respective locations of measurement can be managed on the basis of ID numbers, there is an advantage that changes with the passage of time in respective locations are easy to rearrange.

Figure 34:
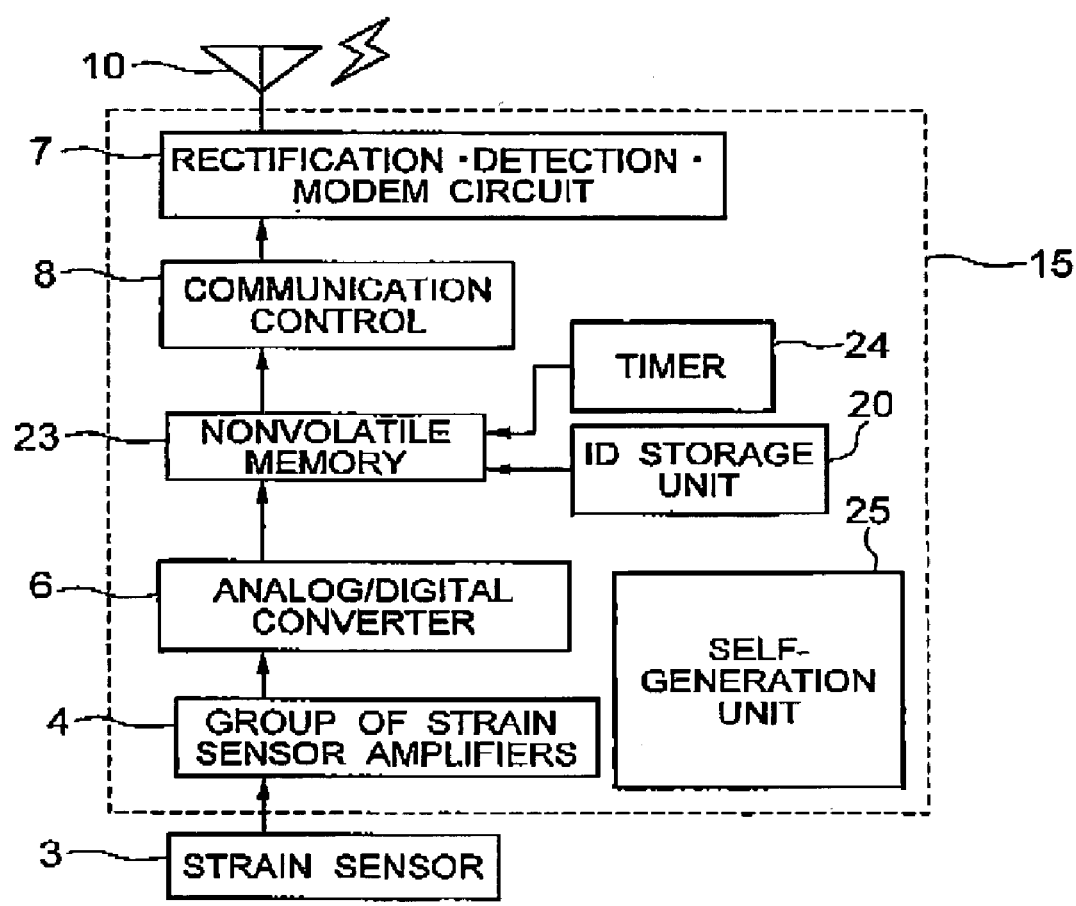
FIG. 34 is a block diagram illustrating the construction of the bolt with a function of measuring strain, according to the fifth embodiment of the invention.

Also, FIG. 34 shows the construction of a further bolt 1 with a function of measuring strain, the construction comprising a self-generation unit to enable measurement of a mechanical quantity even except at the time of radio irradiation with the leader 18. Also, a feature resides in that a nonvolatile memory 23 is built in to be able to store values of strain in a nonvolatile manner. That is, since a large electric energy is needed to transmit measured values with radio waves, energy for transmission of radio waves is supplied by any one of electromagnetic coupling, electromagnetic induction, microwave feeding, and optical coupling, and energy with self-generation is supplied to measurement, which does not need a large electric energy. Also, a timer 24 is built in whereby there is produced an advantage that it is possible to simultaneously store time, load, and an ID number. Also, measured values stored in the nonvolatile memory 23 can be read through any one of electromagnetic coupling, electromagnetic induction, microwave feeding, and optical coupling. Since the invention is applied to enable reducing power consumption of the strain sensors 3, it becomes possible to realize a bolt 1 with a function of measuring strain, shown in FIG. 34. That is, transmission of radio waves is covered by a power source given by any one of electromagnetic coupling, electromagnetic induction, microwave feeding, and optical coupling and besides power consumption of the sensors can be reduced, so that measurement can be performed at all times even when the self-generation unit 25 generates a small amount of electricity. Here, the self-generation unit 25 includes a power supply, such as vibration power generation, photovoltaic power generation, power generation with a piezoelectric element, power generation with hydrodynamic force, etc., which is small in electric power generation but not exhaustive like a battery. In this manner, the embodiment has a great advantage of being practical even in applications, in which the self-generation unit 25 is small in output. Also, in the case where a battery without a function of accumulating electricity is used in place of the self-generation unit 25, there is also produced an advantage that the battery can be extended in service life. Also, an action such as measurement of strain, transmission of values of strain, etc. is possible provided that even if an action is not based on electromagnetic energy, an action based on a power source of only the self-generation unit 25 is intermittent. In this case, power consumption of the strain sensors 3 must be extremely reduced, in which case it is possible according to the invention to restrict influences of noise, thus enabling accurate measurement. Also, according to the invention, since the power supply ground of the chip 15 and the bolt 12 are electrically connected, it is possible to enhance energy efficiency when radio waves are transmitted. Therefore, even when power is supplied only by the self-generation unit 25, an action becomes possible even with a further slight electric power generation.

Figure 35:
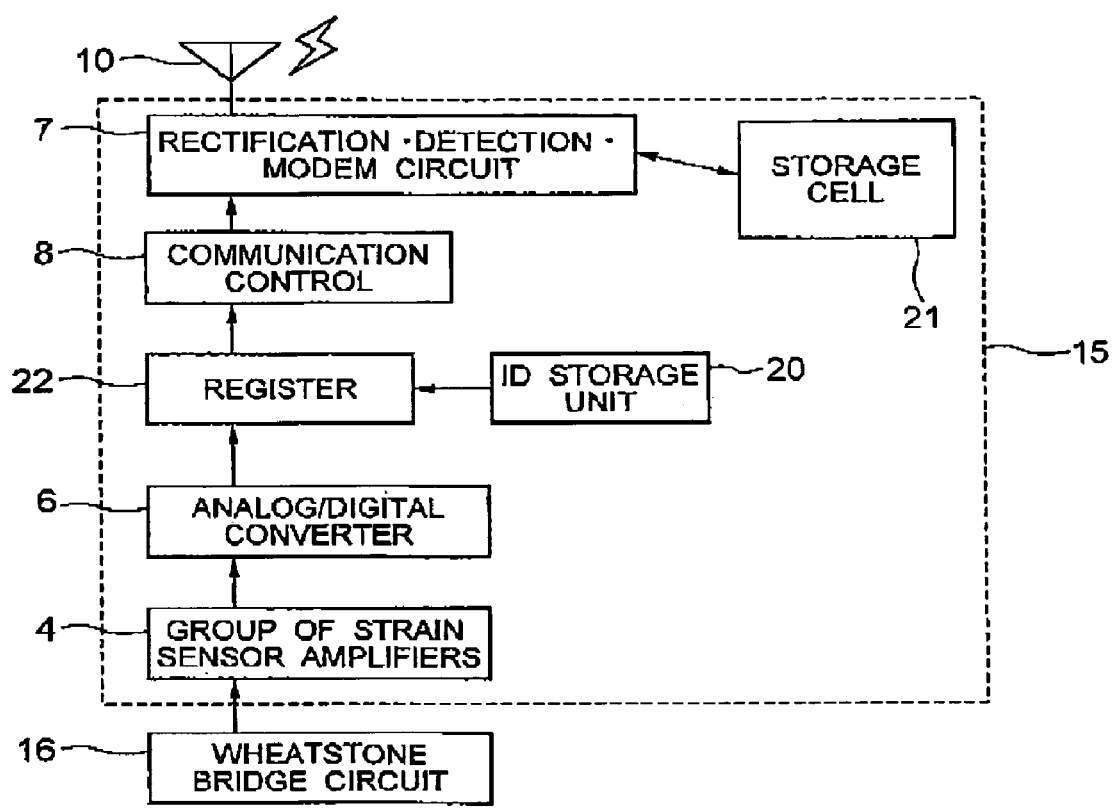
FIG. 35 is a block diagram illustrating the construction of the bolt with a function of measuring strain, according to the fifth embodiment of the invention.
Figure 36:
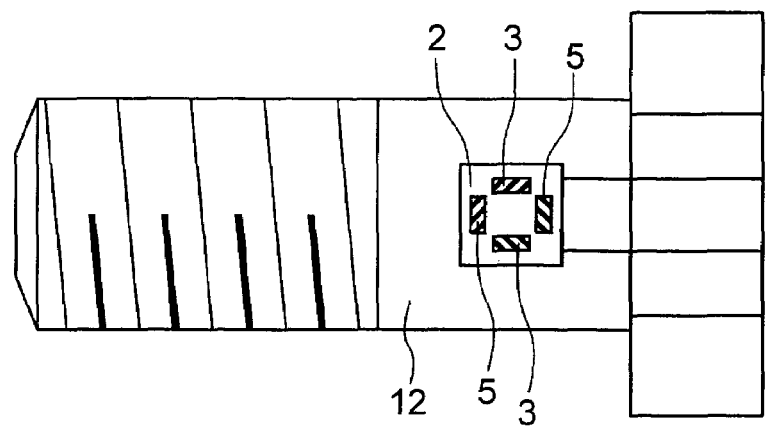
FIG. 36 is a cross sectional view showing the bolt with a function of measuring strain, according to the third embodiment of the invention.
Figure 37:
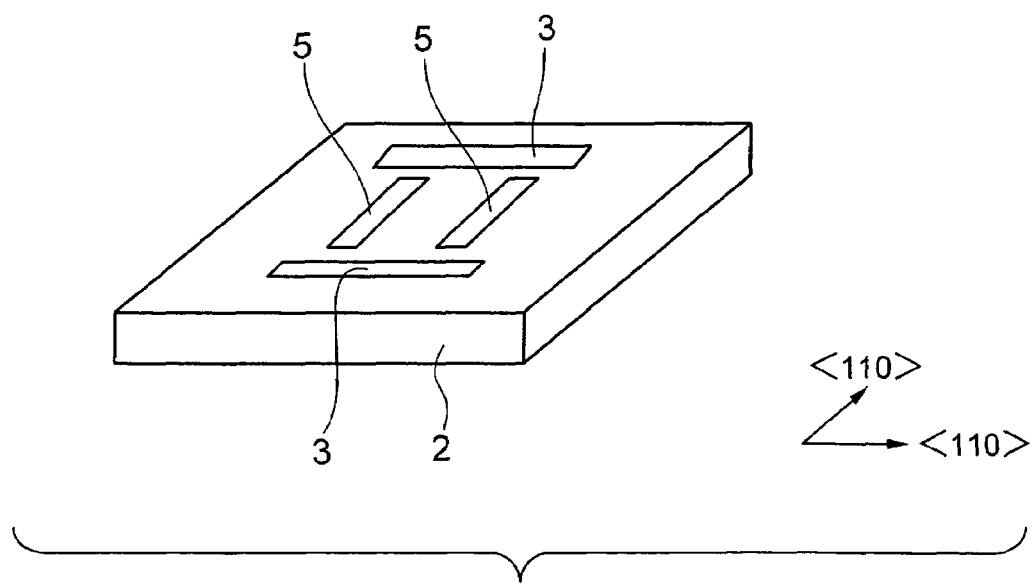
FIG. 37 is a view illustrating the strain measuring part of the bolt with a function of measuring strain, according to the third embodiment of the invention.

Also, FIG. 35 shows an example, in which power is supplied by any one of electromagnetic coupling, electromagnetic induction, microwave feeding, and optical coupling and a mechanism is provided to conduct a part of the power to a storage cell 21 to charge the same therein. Since electric power at the time of sensing can be made very slight according to the invention, it is possible to measure a strain value at all times or intermittently by the use of electric power of the storage cell 21. Since a sufficient electric power is needed to output a value over the radio, an action is performed receiving electric power supplied by radio waves as in the first embodiment when measured values are read. Also, the storage cell 21 is simultaneously charged with electricity. Since the invention is applied to enable reducing power consumption of the strain sensors 3, it will do with a small quantity of charged electricity and it becomes possible to realize an apparatus for measurement of mechanical quantity, shown in FIG. 35. FIG. 36 shows a sixth embodiment of the invention. With a bolt 1 with a function of measuring strain, according to the embodiment, strain sensors 3 and dummy resistors 5 are formed in the same silicon monocrystal substrate 2, which is embedded in a hole of the bolt formed in an axial direction. The strain sensors 3 and the dummy resistors 5 are formed to have regions, which are formed by diffusing a P-type impurity in the crystal silicon substrate 2, such that a lengthwise direction of those regions of the strain sensors 3, in which the P-type impurity is diffused, corresponds substantially to a <110> direction of the crystal silicon substrate 2 and a lengthwise direction of those regions of the dummy resistors 5, in which the P-type impurity is diffused, corresponds substantially to a <−110> direction of the crystal silicon substrate 2. Accordingly, an arrangement becomes such that a line connecting two electrodes at both ends of diffusion layers of the strain sensors 3 and a line connecting two electrodes at both ends of diffusion layers of the dummy resistors 5 are made substantially perpendicular to each other. Further, when the crystal silicon substrate 2 is mounted in a hole formed in the bolt, a central axis of rotation being a lengthwise direction of the bolt becomes substantially in agreement with the <110> direction of the crystal silicon substrate 2. That is, a lengthwise direction of the impurity diffusion layers of the strain sensors 3 is arranged to be made substantially in agreement with the lengthwise direction of the bolt. While it is desired that the lengthwise direction be in agreement with the lengthwise direction of the diffusion layers, an effect is fairly produced even when the both directions are somewhat different from each other. Further, a lengthwise direction of the impurity diffusion layers of the dummy resistors is arranged to be made substantially perpendicular to the lengthwise direction of the bolt. While it is desired that the lengthwise direction be perpendicular to the lengthwise direction of the diffusion layers, an effect is fairly produced even when the both directions are somewhat different from each other. Also, even when the strain sensors 3 and the dummy resistors 5 are formed in a manner to have those regions, which are formed by diffusing an N-type impurity in the crystal silicon substrate 2, the same effect is produced while sensitivity is lowered.

According to the embodiment, there is produced an advantage that measurement with high sensitivity becomes possible. Since little strain is generated in a direction perpendicular to the lengthwise direction when an axial force of a bolt is measured, the strain sensors 3 are susceptible to strain only in the lengthwise direction and the dummy resistors 5 are susceptible to strain only in a direction perpendicular to the lengthwise direction when the bolt is clamped. In this case, a variation twice a variation of resistance with only the strain sensors 3 is obtained by using the strain sensors 3 and the dummy resistors 5 to construct a Wheatstone bridge in order to generate a variations of resistance, which are reverse to each other in sign.

Also, the same effect as those in the first to fifth embodiments is produced when a translate circuit that amplifies a signal from the Wheatstone bridge circuit to convert the same into a digital signal, a transmitting circuit that transmits the digital signal outside the bolt, and a power circuit, by which electromagnetic wave energy received from outside the bolt becomes a power source for the circuits, are connected to the bolt 1 with a function of measuring strain.

While the embodiments have been described, the invention is not limited thereto but it is apparent to those skilled in the art that various modifications and corrections can be made within the spirit of the invention and the scope of the claims.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A bolt having a Wheatstone bridge circuit comprising strain sensors and dummy resistors, wherein the strain sensor and the dummy resistor, which constitute the Wheatstone bridge circuit, are formed on a common silicon monocrystal substrate, the strain sensor includes a p-type impurity diffusion layer, the dummy resistor includes a p-type impurity diffusion layer, the strain sensor is formed to be lengthwise in a <110> direction of the silicon substrate, the dummy resistor is formed to be lengthwise in a <100> direction of the silicon substrate, and the strain sensor is disposed so that a lengthwise direction of the strain sensor extends in an axial direction of the bolt.

2. A bolt according to claim 1, comprising a translate circuit that amplifies a signal from the Wheatstone bridge circuit to convert the same into a digital signal, a transmitting circuit that transmits the digital signal outside the bolt, and a power circuit, by which electromagnetic wave energy received from outside the bolt is supplied as a power source for at least any one of the circuits.

3. A bolt according to claim 1, wherein a temperature sensor comprising an impurity diffusion layer is provided in the silicon substrate.

4. A bolt according to claim 1, wherein the silicon substrate has a (001) plane on surface thereof.

5. A bolt having a Wheatstone bridge circuit comprising a strain sensor and a dummy resistor, wherein the strain sensor and the dummy resistor, which constitute the Wheatstone bridge circuit, are formed in a common silicon monocrystal substrate, the strain sensor includes an n-type impurity diffusion layer, the dummy resistor includes an n-type impurity diffusion layer, the strain sensor is formed to be lengthwise in a <100> direction of the silicon substrate, the dummy resistor is formed to be lengthwise in a <110> direction of the silicon substrate, and the strain sensor is disposed so that a lengthwise direction of the strain sensor extends in an axial direction of the bolt.

6. A bolt having a Wheatstone bridge circuit comprising a strain sensor and a dummy resistor, wherein the strain sensor and the dummy resistor, which constitute the Wheatstone bridge circuit, are formed in a common silicon monocrystal substrate, the strain sensor includes a p-type impurity diffusion layer, the dummy resistor includes an n-type impurity diffusion layer, the strain sensor and the dummy resistor are formed to be lengthwise in a <110> direction of the silicon monocrystal substrate, and the strain sensor is disposed so that a lengthwise direction of the strain sensor extends in an axial direction of the bolt.

7. A bolt having a Wheatstone bridge circuit comprising a strain sensor and a dummy resistor, wherein the strain sensor and the dummy resistor, which constitute the Wheatstone bridge circuit, are formed in a common silicon monocrystal substrate, the strain sensor includes an n-type impurity diffusion layer, the dummy resistor includes a p-type impurity diffusion layer, the strain sensor and the dummy resistor are formed to be lengthwise in a <100> direction of the silicon monocrystal substrate, and the strain sensor is disposed so that a lengthwise direction of the strain sensor extends in an axial direction of the bolt.

8. A bolt according to claim 7, comprising a translate circuit that amplifies a signal from the Wheatstone bridge circuit to convert the same into a digital signal, a transmitting circuit that transmits the digital signal outside the bolt, and a power circuit, by which electromagnetic wave energy received from outside the bolt is supplied as a power source for at least any one of the circuits.

9. A bolt according to claim 7, wherein a temperature sensor comprising an impurity diffusion layer is provided in the silicon substrate.

10. A bolt according to claim 7, wherein the silicon substrate has a (001) plane on surface thereof.

11. A bolt having a Wheatstone bridge circuit comprising a strain sensor and a dummy resistor, wherein the strain sensor and the dummy resistor, which constitute the Wheatstone bridge circuit, are formed in a common silicon monocrystal substrate, and include a p-type impurity diffusion layer, and are formed to be lengthwise in a <110> direction of the silicon monocrystal substrate, the strain sensor is disposed so that a lengthwise direction of the strain sensor extends in an axial direction of the bolt, and the dummy resistor is disposed so that a lengthwise direction of the dummy resistor extends perpendicular to the axial direction of the bolt.

12. A bolt according to claim 11, comprising a translate circuit that amplifies a signal from the Wheatstone bridge circuit to convert the same into a digital signal, a transmitting circuit that transmits the digital signal outside the bolt, and a power circuit, by which electromagnetic wave energy received from outside the bolt is supplied as a power source for at least any one of the circuits.

13. A bolt according to claim 11, wherein a temperature sensor comprising an impurity diffusion layer is provided in the silicon substrate.

14. A bolt according to claim 11, wherein the silicon substrate has a (001) plane on surface thereof.

15. A bolt having a Wheatstone bridge circuit comprising a strain sensor and a dummy resistor, wherein the strain sensor and the dummy resistor, which constitute the Wheatstone bridge circuit, are formed in a common silicon monocrystal substrate, and include an n-type impurity diffusion layer, and are formed to be lengthwise in a <100> direction of the silicon substrate, the strain sensor is disposed so that a lengthwise direction of the strain sensor extends in an axial direction of the bolt, and the dummy resistor is disposed so that a lengthwise direction of the dummy resistor extends perpendicular to the axial direction of the bolt.

* * * * *